(12) United States Patent
Kachita et al.

(10) Patent No.: US 9,520,694 B2
(45) Date of Patent: Dec. 13, 2016

(54) OPTICAL AMPLIFIER WITH LOSS ADJUSTMENT UNIT BASED ON GAIN

(71) Applicant: FUJITSU LIMITED, Kawasaki-shi, Kanagawa (JP)

(72) Inventors: Yoshito Kachita, Kawasaki (JP); Tomoaki Takeyama, Yokohama (JP); Norifumi Shukunami, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/631,165

(22) Filed: Feb. 25, 2015

(65) Prior Publication Data

US 2015/0280391 A1  Oct. 1, 2015

(30) Foreign Application Priority Data

Mar. 28, 2014 (JP) ................. 2014-070563

(51) Int. Cl.
  *H01S 3/067* (2006.01)
  *H01S 3/10* (2006.01)
  *H04B 10/00* (2013.01)
  *H01S 3/13* (2006.01)
  *H01S 3/16* (2006.01)

(52) U.S. Cl.
  CPC ....... *H01S 3/06758* (2013.01); *H01S 3/10015* (2013.01); *H04B 10/00* (2013.01); *H01S 3/10069* (2013.01); *H01S 3/1301* (2013.01); *H01S 3/1608* (2013.01); *H01S 2301/04* (2013.01)

(58) Field of Classification Search
  CPC ............... H04B 10/294; H04B 10/2942; H01S 3/06754; H01S 3/06758; H01S 3/10015
  See application file for complete search history.

(56) References Cited

U.S. PATENT DOCUMENTS

| | | | |
|---|---|---|---|
| 6,621,625 B1* | 9/2003 | Zhang | H01S 3/06758 359/341.4 |
| 2003/0002104 A1* | 1/2003 | Caroli | H04J 14/0204 398/82 |
| 2003/0053175 A1* | 3/2003 | Szczepanek | H04J 14/0221 398/164 |
| 2006/0203329 A1* | 9/2006 | Nishihara | H01S 3/06754 359/337 |
| 2007/0014513 A1 | 1/2007 | Isomura et al. | |
| 2010/0111534 A1* | 5/2010 | Veselka, Jr. | H04J 14/0221 398/79 |
| 2012/0063771 A1* | 3/2012 | Sugaya | H04B 10/2935 398/26 |
| 2012/0087669 A1 | 4/2012 | Biwa et al. | |

(Continued)

FOREIGN PATENT DOCUMENTS

| | | |
|---|---|---|
| JP | 2007-028207 A | 2/2007 |
| JP | 2012-84965 A | 4/2012 |
| JP | 2012-156285 A | 8/2012 |

*Primary Examiner* — Eric Bolda
(74) *Attorney, Agent, or Firm* — Fujitsu Patent Center

(57) ABSTRACT

An optical amplifier includes an optical amplifying unit, a splitting unit, and a loss adjusting unit. The optical amplifying unit provides gain to wavelength multiplexed light received from a transmission line, to amplify light intensity. The splitting unit splits the amplified wavelength multiplexed light. The loss adjusting unit adjusts loss provided to each wavelength of a first portion of the split wavelength multiplexed light based on the gain.

4 Claims, 18 Drawing Sheets

(56) References Cited

U.S. PATENT DOCUMENTS

2012/0141121 A1* 6/2012 Itoh ..................... H04B 10/294
398/34
2012/0188631 A1 7/2012 Shukunami et al.
2012/0321300 A1* 12/2012 Sueoka ............ H04B 10/07955
398/34

* cited by examiner

FIG.8

| ch | WAVE-LENGTH [nm] | TARGET GAIN [dB] | | | | | | | | | |
|---|---|---|---|---|---|---|---|---|---|---|---|
| | | 28 | 26 | 24 | 22 | 20 | 18 | 16 | 14 | 12 |
| 1 | 1528.77 | 8.1 | 5.4 | 2.7 | 0.0 | 0.0 | 0.0 | 0.0 | 0.0 | 0.0 |
| 2 | 1529.16 | 8.1 | 5.4 | 2.7 | 0.0 | 0.0 | 0.0 | 0.0 | 0.0 | 0.0 |
| 3 | 1529.55 | 8.1 | 5.4 | 2.7 | 0.0 | 0.0 | 0.0 | 0.0 | 0.0 | 0.0 |
| 4 | 1529.94 | 8.1 | 5.4 | 2.7 | 0.0 | 0.0 | 0.0 | 0.0 | 0.0 | 0.0 |
| 5 | 1530.33 | 8.0 | 5.3 | 2.7 | 0.0 | 0.0 | 0.1 | 0.1 | 0.1 | 0.1 |
| 6 | 1530.72 | 7.9 | 5.3 | 2.6 | 0.0 | 0.0 | 0.1 | 0.1 | 0.1 | 0.2 |
| 7 | 1531.12 | 7.8 | 5.2 | 2.6 | 0.0 | 0.1 | 0.1 | 0.2 | 0.2 | 0.2 |
| 8 | 1531.51 | 7.6 | 5.1 | 2.5 | 0.0 | 0.1 | 0.2 | 0.3 | 0.3 | 0.4 |
| 9 | 1531.90 | 7.5 | 5.0 | 2.5 | 0.0 | 0.1 | 0.2 | 0.3 | 0.4 | 0.5 |
| 10 | 1532.29 | 7.3 | 4.8 | 2.4 | 0.0 | 0.1 | 0.2 | 0.4 | 0.5 | 0.6 |
| . | . | . | . | . | . | . | . | . | . | . |
| . | . | . | . | . | . | . | . | . | . | . |
| . | . | . | . | . | . | . | . | . | . | . |
| 81 | 1560.61 | 0.6 | 0.4 | 0.2 | 0.0 | 1.1 | 2.1 | 3.2 | 4.2 | 5.3 |
| 82 | 1561.01 | 0.6 | 0.4 | 0.2 | 0.0 | 1.1 | 2.1 | 3.2 | 4.3 | 5.4 |
| 83 | 1561.42 | 0.5 | 0.3 | 0.2 | 0.0 | 1.1 | 2.2 | 3.3 | 4.3 | 5.4 |
| 84 | 1561.83 | 0.4 | 0.3 | 0.1 | 0.0 | 1.1 | 2.2 | 3.3 | 4.4 | 5.5 |
| 85 | 1562.23 | 0.3 | 0.2 | 0.1 | 0.0 | 1.1 | 2.2 | 3.3 | 4.4 | 5.5 |
| 86 | 1562.64 | 0.2 | 0.1 | 0.1 | 0.0 | 1.1 | 2.2 | 3.4 | 4.5 | 5.6 |
| 87 | 1563.05 | 0.1 | 0.1 | 0.0 | 0.0 | 1.1 | 2.3 | 3.4 | 4.5 | 5.7 |
| 88 | 1563.45 | 0.0 | 0.0 | 0.0 | 0.0 | 1.2 | 2.3 | 3.5 | 4.6 | 5.8 |

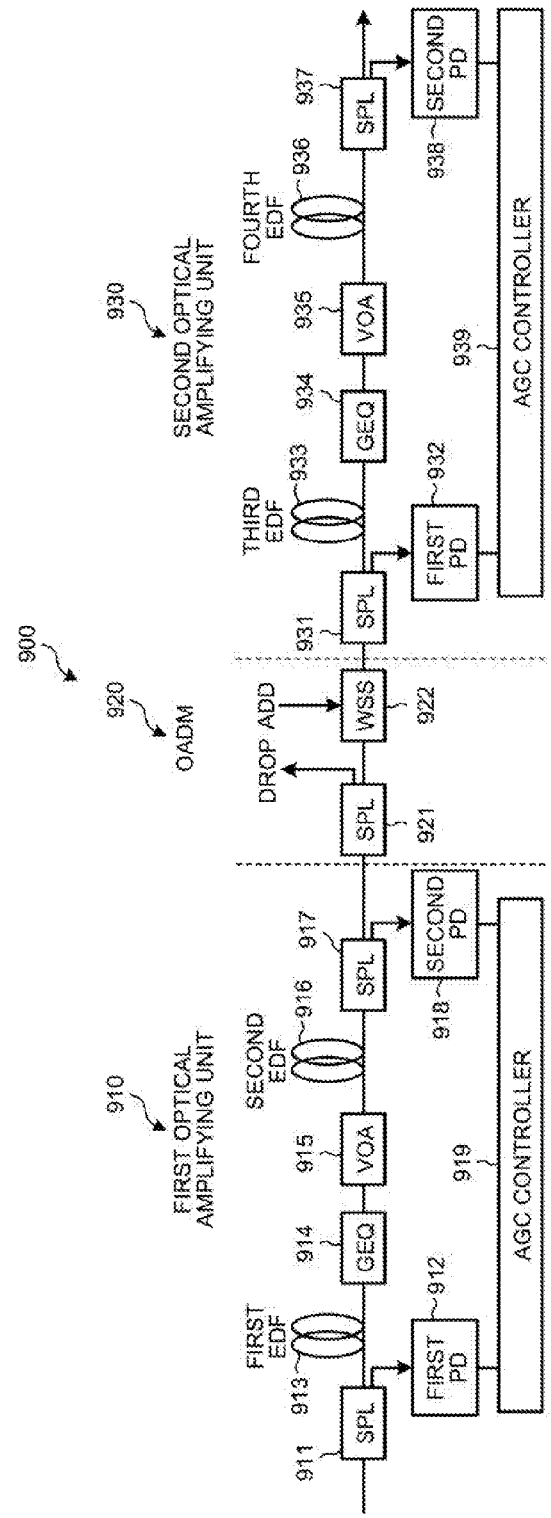

OPTICAL AMPLIFIER WITH LOSS ADJUSTMENT UNIT BASED ON GAIN

CROSS-REFERENCE TO RELATED APPLICATION

This application is based upon and claims the benefit of priority of the prior Japanese Patent Application No. 2014-070563, filed on Mar. 28, 2014, the entire contents of which are incorporated herein by reference.

FIELD

The embodiments discussed herein are related to an optical amplifier.

BACKGROUND

Wavelength division multiplexing (WDM) transmission systems mainly include an optical amplifying unit and en optical add-drop multiplexer (OADM). The OADM is provided with a wavelength selective switch (WSS), for example. The WSS can flexibly switch the setting of a route for each wavelength. To compensate loss in the OADM and increase output power to a transmission line fiber, the optical amplifying unit may be arranged before and after the OADM.

Examples of the optical amplifying unit include erbium-doped fiber amplifiers (EDFA) provided with an erbium-doped fiber (EDF). EDFAs can amplify a band of 1530 to 1565 nm (C-band) and 1565 to 1625 nm (L-band). By using the broadband property of EDFAs, WDM transmission systems capable of transmitting signals of 80 or more waves are out to practical use. Furthermore, semiconductor optical amplifiers (SOA) and Raman amplifiers are put to practical use.

An optical amplifying unit includes an EDF, a photo diode (PD), a splitter (SPL), a gain equalizer (GEQ), and a variable optical attenuator (VOA). The EDF provides a gain to a signal having loss in a transmission line. Because the gain provided to each wavelength of the signal by the EDF is not flat, the GEQ flattens the gain. The PD receives a signal split by the SPL to detect the amount of light. The VOA changes the gain provided by the EDF based on the amount of light detected by the PD. To decrease the gain by 1 dB, for example, the VOA increases the loss by 1 dB, thereby varying the gain. Thus, the optical amplifying unit controls the gain provided to the signal.

Patent Document 1: Japanese Laid-open Patent Publication No. 2012-156285
Patent Document 2 Japanese Laid-open Patent. Publication. No. 2012-084965
Patent Document 3 Japanese Laid-open Patent Publication No. 2007-028207

The related devices, however, have a large number of components, thereby increasing in size.

The related WDM transmission system includes the optical amplifying unit and the OADM, for example. To vary gain in the optical amplifying unit, the VGA controls the gain, and the OADM controls signal power at each wavelength using a VGA function of the WSS. An influence of the VOA provided to both the optical amplifying unit and the OADM increases optical loss, the size of the device, and cost. Because of the increase in optical loss, a second optical amplifying unit may be added after the OADM. The addition of the second optical amplifying unit further increases the size of the device and the cost.

SUMMARY

According to an aspect of the embodiments, an optical amplifier includes: an optical amplifying unit that provides gain to wavelength multiplexed light received from a transmission line, to amplify light intensity; a splitting unit that splits the amplified wavelength multiplexed light; and a loss adjusting unit that adjusts loss provided to each wavelength of a first portion of the split wavelength multiplexed light based on the gain.

The object and advantages of the invention will be realized and attained by means of the elements and combinations particularly pointed out in the claims:

It is to be understood that both the foregoing general description and the following detailed description are exemplary and explanatory and are not restrictive of the invention.

BRIEF DESCRIPTION OF DRAWINGS

FIG. 8 is an example diagram of an attenuation amount table;
FIG. 20 is a diagram for explaining an optical amplifier according to a first reference example.

DESCRIPTION OF EMBODIMENTS

Figure 1:
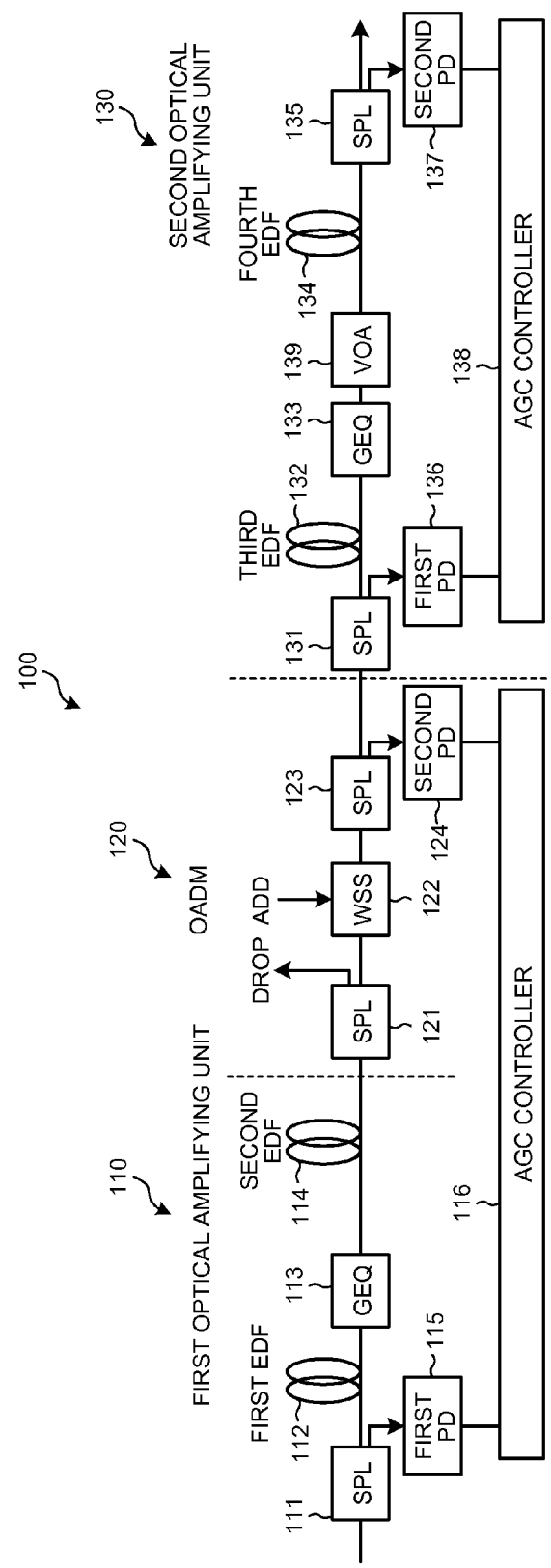
FIG. 1 is a first diagram for explaining an optical amplifier according to a first embodiment.

Preferred embodiments will be explained with reference to accompanying drawings. The embodiments are not intended to limit the scope of the invention. The embodiments can be optionally combined without causing any inconsistency in the processing contents.

[a] First Embodiment

Explanation of an Optical Amplifier According to a First Reference Example

An optical amplifier according to a first reference example will be described with reference to FIG. 20. FIG. 20 is a diagram for explaining the optical amplifier according to the first reference example. An optical amplifier 900 according to the first reference example includes a first optical amplifying unit 910, an OADM 920, and a second optical amplifying unit 930. The first optical amplifying unit 910 includes an SPL 911, a first. PD 912, a first EDF 913, a. GEQ 914, a VOA 915, a second EDF' 916, an SPL 917, a second PD 918, and an auto gain control AGC) controller 919. The OADM 920 includes an SPT 921 and a WSS 922. The second optical amplifying unit 930 includes an SPL 931, a first PD 932, a third EDF 933, a GEQ 934, a VOA 935, a fourth. EDF 936, an SPL 937, a second. PD 938, and an AGC controller 939.

The first, optical amplifying unit 910 compensates transmission signals traveling in a transmission line for loss in the transmission line. The AGC controller 919 adjusts excitation power in the first EDF 913 and the second. EDF 915, thereby controlling gain provided by the first optical amplifying unit 910. The GEQ 914 flattens the gain provided, by the first optical amplifying unit 910. The VOA 915 is used to change the gain. To decrease the gain by 1 dB, for example, the first optical amplifying unit 910 increases the loss in the VOA by 1 dB. The OADM 920 adds or drops a signal. The second optical amplifying unit 930 amplifies a Through signal attenuated by the SPL 921 and the WSS 922 and an Add signal added by the WSS 922 and transmits the signals to a transmission line fiber. A signal passing through the WSS 922 corresponds to the Through signal, whereas the signal added by the WSS 922 corresponds to an Add signal.

The configuration of the second optical amplifying unit 930 corresponds to that of the first optical amplifying unit 910. The second optical amplifying unit 930 also uses the VOA 935 to change gain. As described above, the VOAs in the optical amplifier 900 according to the first reference example are provided to the respective, optical amplifying units. This configuration increases the number of components, making it difficult to downsize the device.

Explanation of an Optical Amplifier According to a First Embodiment

An optical amplifier according to a first embodiment will be described with reference to FIG. 1. FIG. 1 is a first diagram for explaining the optical amplifier according to the first embodiment. As illustrated in the example in FIG. 1, an optical amplifier 100 includes a first optical amplifying unit 110, an OADM 120, and a second optical amplifying unit 130. The first optical amplifying unit 110 includes an SPL 111, a first EDF 112, a. GEQ 113, a second EDF 114, a first PD 115, and an AGC controller 116. The OADM 120 includes an SPL 121, a WEE 122, an SPL 123, and a second PD 124. The second optical amplifying unit 130 includes an SPL 131, a third EDF 132, a. GEQ. 133, a VOA 139, a fourth EDF 134, an SPL 135, a first PD 136, a second PD 137, and an AGC controller 136.

The first optical amplifying unit 110 compensates transmission signals traveling in a transmission line for loss in the transmission line. The SPL 111 splits, a part of the transmission signals received by the optical amplifier 100 and transmits it to the first PD 115. The first PD 115 detects power of all the signals received from the SPL 111. The power of all the signals is light intensity of the signals at all the wavelengths included in the transmission signals. The first EDF 112 and the second EDF 114 provide gain corresponding to excitation power to the transmission signals. In a case where the gain flattening amount of the WSS 122 is insufficient, the GEQ 113 flattens the gain provided by the first. EDF 112 and the second EDF 114.

The OADM 120 adds a signal to the transmission signals or drops a signal from the transmission signals. The added signal is hereinafter referred to as an Add signal, whereas the dropped signal is referred to as a Drop signal. The SPL 121 drops signals at some wavelengths out of the signals transmitted from the route. The WSS 122 adds a signal at a predetermined wavelength to the route. The WEE 122 has a function not to transmit the transmission signals forward and a function to transmit them without any interruption. A transmission signal prevented from being transmitted forward is hereinafter referred to as a. Block signal, whereas a transmission signal to be transmitted without any interruption is referred to as a Through signal. The second PD 124 detects signal power output from the OADM 120 based on the signals output, from the SPL 123.

Because the Drop signal output by the SPL 121 and the Add signal added by the WEE 122 change the wavelength number of the signals detected by the second PD 124, the AGC controller 116 corrects the signal power detected by the second. PD 124 based on the number of Drop signals and the number of Add signals. The AGC controller 116 controls the excitation power supplied to the first. EDF 112 and the second EDF 114 to amplify the transmission signals based on the signal power detected by the first PD 115 and the corrected signal power detected by the second PD 124.

By changing the excitation power supplied to the first EDF 112 and the second EDF 114, the AGC controller 116 can control the gain provided to the transmission signals. When the AGC controller 116 changes the gain, a gain tilt occurs in the transmission signals. The gain tilt is a change in gain wavelength characteristics occurring when the gain provided to the transmission signals is changed. The WSS 122 adjusts the amount of loss provided at each wavelength, thereby preventing the gain tilt.

Figure 2:
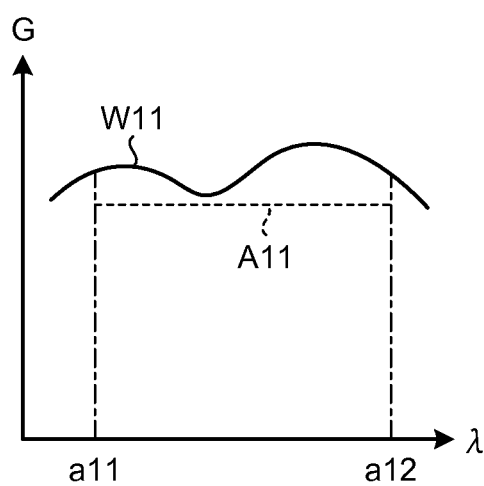
FIG. 2 is an example diagram of gain wavelength characteristics of an EDF.
Figure 3:
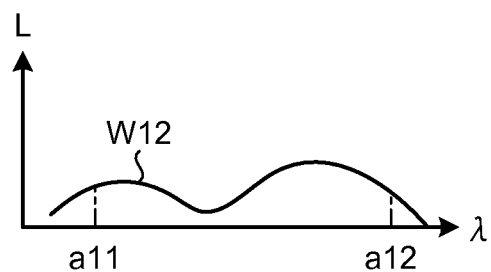
FIG. 3 is an example diagram of loss wavelength characteristics of a GEQ.
Figure 4:
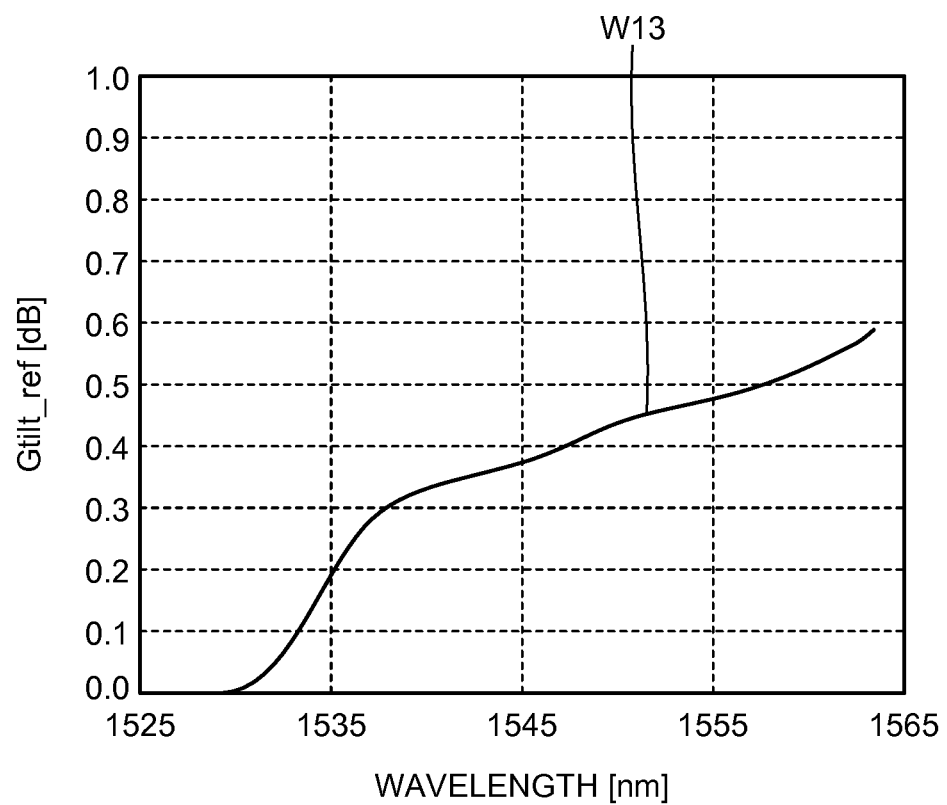
FIG. 4 is an example diagram of a gain tilt of the EDF.

The following describes the gain tilt with reference to FIGS. 2 to 4. FIG. 2 is an example diagram of gain wavelength characteristics of the EDF. The abscissa in FIG. 2 indicates a wavelength λ, and the ordinate indicates a gain G. The waveform. W11 illustrated in the example in FIG. 2 indicates the gain wavelength characteristics provided by the EDF 112. The wavelengths between a11 and a12 illustrated, in FIG. 2 indicate a WDM signal, band. As illustrated in the example in FIG. 2, the waveform W11 indicating the gain provided by the first EDF 112 has unevenness. In a case where the gain, provided to the transmission signals is not flat in this manner, the transmission signals may possibly deteriorate. To address this, the WSS 122 and the GEQ 113 provide loss to the signals at each wavelength, thereby flattening the gain.

FIG. 3 is an example diagram of loss wavelength characteristics of the GEQ. The abscissa in FIG. 3 indicates the wavelength λ, and the ordinate indicates a loss L. The waveform W12, illustrated in FIG. 3 indicates loss wavelength characteristics of the WS 122 and the GEQ 113. As illustrated in, the example in FIG. 3, the waveform W12 has the same shape as that of the waveform W11 in the example in FIG. 2. By providing the loss of the waveform W12 to the gain of the waveform W11, the WSS 122 and the GEQ 113 can cancel the variations in the waveform W11. As a, result, the waveform W11 is made flat at each wavelength as indicated by the dotted, line A11 in FIG. 2.

In a case where the first optical amplifying unit 110 changes the gain provided by the first EDF 112, however, a, gain tilt occurs. FIG. 4 is an example diagram of the gain tilt of the EDF. The abscissa. In FIG. 4 indicates the wavelength, and the ordinate indicates the gain tilt. The waveform W13 indicates a gain tilt, in a case where the gain, of the EDF 112 is decreased by 1 dB. If the first. EDF 112 decreases the gain, by 1 dB, a gain tilt occurs with respect to the wavelength as indicated by the waveform W13. A gain tilt Y1 is expressed by Equation (1) where λ (nm) is a wavelength and n is a decreased, gain (dB).

$$Y1 = Gtilt\_ref(\lambda) \times n \qquad (1)$$

As described above, if the first EDF 112 changes the gain provided, to the transmission signals, a gain tilt occurs. The change in the gain made by the first. EDF 112 generates unevenness in the waveform of the gain provided to the transmission signals. The WSS 122 adjusts the amount of loss provided to the transmission signals at each wavelength, thereby preventing the gain tilt. By preventing the gain tilt using the function of the WSS instead of that of the VOA, it is possible to reduce the number of components and thus downsize the device.

The VOA changes the gain provided to all the wavelengths of the transmission signals, whereas the WSS can adjust the loss provided to the transmission signals at each wavelength. By providing the loss at each wavelength from the WSS, it is possible to make the amount of loss provided to the transmission signals smaller than the VOA does.

The second optical amplifying unit 130 amplifies the Through signal, attenuated by the SPL 121 and the WSS 122 and the Add signal added by the WSS 122 and transmits the signals to the transmission line fiber. Because the second optical amplifying unit 130 has the same devices as those of the first optical amplifying unit 910 and the second optical amplifying unit 930 in FIG. 20, explanation, of the devices will be omitted. The first optical amplifying unit 110 is called a pre-amplifier, whereas the second optical amplifying unit 130 is called a post amplifier.

Figure 5:
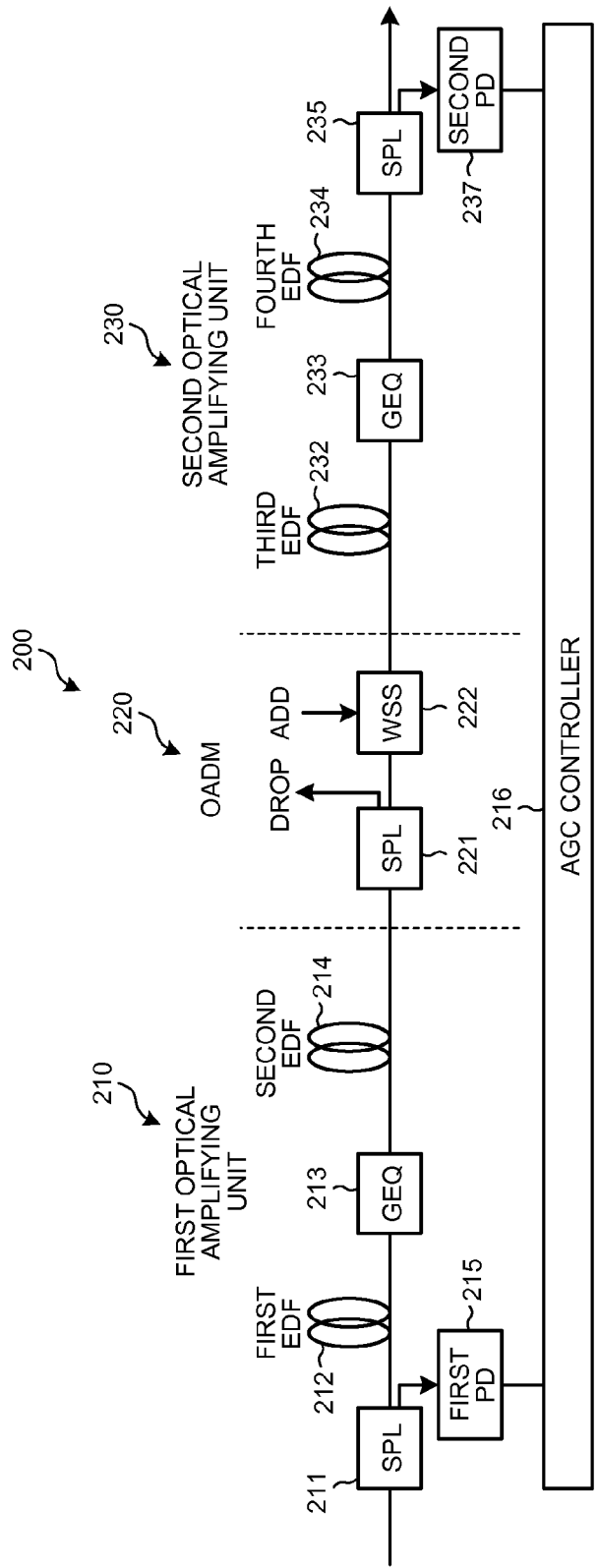
FIG. 5 is a first diagram for explaining an optical amplifier according to a sixth embodiment.

FIG. 5 is a first, diagram for explaining an optical amplifier according to a sixth embodiment. The example, in FIG. 5 is another aspect, of the optical amplifier 100 illustrated, in the example in FIG. 1. An optical amplifier 200 includes a first optical amplifying unit 210, an OADM 220, and a second optical amplifying unit 230. The first optical amplifying unit 210 includes an SPL, 211, a first EDF 212, a. GEQ 213, a second EDF 214, a first PD 215, and an AGC controller 216. The OADM 220 includes an SPL 221 and a WSS 222. The second optical amplifying unit 230 includes a third EDF 232, a GEQ 233, a fourth EDF 234, an SPL 235, and a, second PD 237.

While the AGC controller 116 in the example in FIG. 1 controls the gain in the first optical amplifying unit 110 and the OADM 120 and the AGC controller 138 in the example in FIG. 1 controls the gain in the second optical amplifying unit 130, the AGC controller 216 in the example, in FIG. 5 controls the entire gain in the optical amplifier 200.

In the example in FIG. 5, the first PD 215 detects signals split by the SPL 211 of the first optical amplifying unit 210. By contrast, the second PD 237 detects signals split by the SPL 235 of the second optical amplifying unit 230. Based on the detection value of the first PD 215 and the detection value of the second PD. 237, the AGC controller 216 controls the excitation power supplied to the first EDT 212, the second EDF 214, the third EDT 232, and the fourth EDF 234. Because the operations of the other devices in the optical amplifier 200 are the same as those in the optical amplifier 100, explanation thereof will be omitted.

Figure 6:
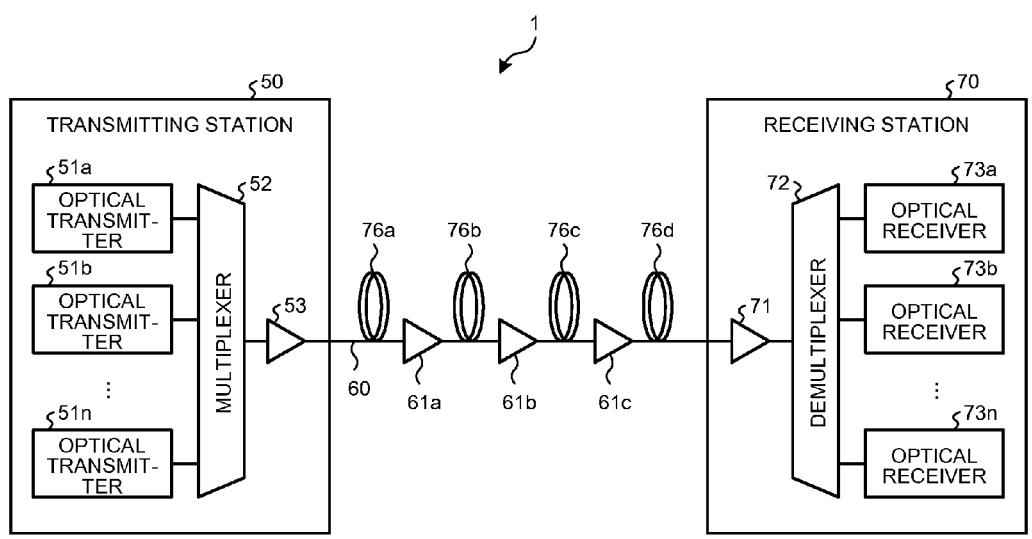
FIG. 6 is an example diagram of an optical transmission system to which the optical amplifier according to the first embodiment is applied.

Example of Application of an Optical Amplifier According to a First Embodiment to a System FIG. 6 is an example diagram of an optical transmission system to which an optical amplifier according to a first embodiment is applied. As illustrated in the example in FIG. 6, an optical transmission system 1 includes a transmitting station 50 and a receiving station 70. The transmitting station 50 is communicably connected to the receiving station 70 with transmission lines 76a to 76d and in-line amplifiers 61a to 61c.

The transmitting station 50 includes optical transmitters 51a to 51n, a multiplexer 52, and a transmitter amplifier 53. The optical transmitters 51a to 51n output optical signals at different wavelengths. The multiplexer 52 multiplexes the optical signals output from the optical transmitters 51a to 51n and outputs the obtained signal to the transmitter amplifier 53 as a WDM signal. The multiplexer 52 is an arrayed waveguide grating (AWG), for example. The transmitter amplifier 53 amplifies and outputs the signal output from the multiplexer 52.

The in-line amplifiers 61a to 61c amplify the signals attenuated in the transmission lines. The in-line amplifiers 61a to 61c compensate loss in the transmission lines 76a to 76d, thereby preventing reduction in the signal power and deterioration in the optical signal to noise ratio (OSNR).

The receiving station. 70 includes a receiver amplifier 71, a demultiplexer 72, and optical receivers 73a to 73n. The receiver amplifier 71 amplifies an optical signal received from the transmission line. 76d. The demultiplexer 72 demultiplexes the WDM signal into optical signals at respective wavelengths. The optical receivers 73a to 73n receive the optical signals at respective wavelengths resulting from demultiplexing by the demultiplexer 72 and reproduce the signal transmitted from the transmitting station 50.

Example of the Optical Amplifier According to the First Embodiment

Figure 7:
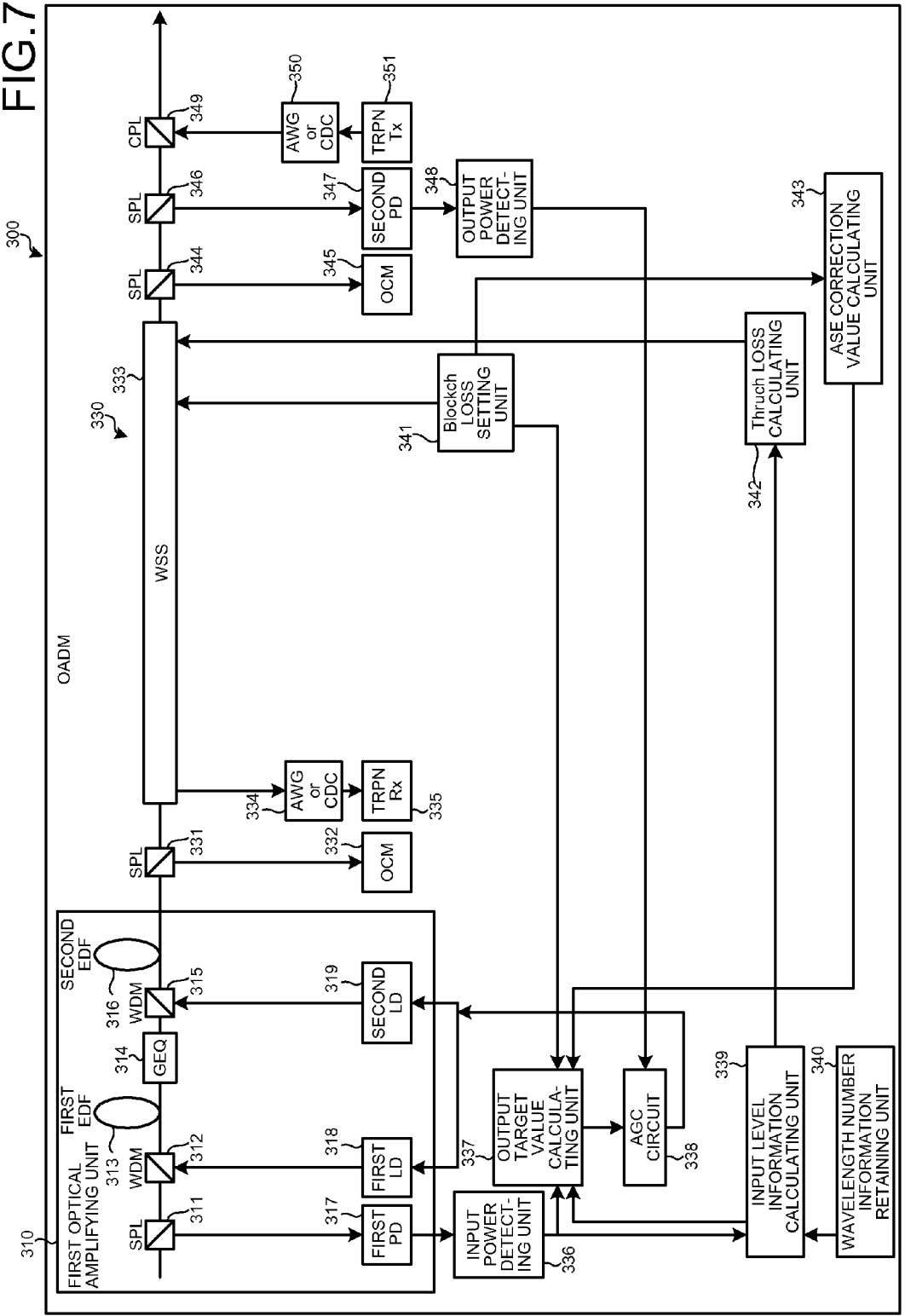
FIG. 7 is an example diagram of a configuration of the optical amplifier according to the first embodiment.

An example of the optical amplifier according to the first embodiment will be described with reference to FIG. FIG. 7 is an example diagram of a configuration of the optical amplifier according to the first embodiment. As illustrated in the example in FIG. 7, an optical amplifier 300 includes a first optical amplifying unit. 310 and an OADM 330. The first optical amplifying unit 310 includes an SPL 311, a WDM 312, a first EDF 313, a GEQ 314, a WDM 315, a second EDF 316, a first PD 317, a first LD 318, and a second LD 319. The OADM 330 includes an SPL 331, an optical channel monitor (OCM) 332, a WSS 333, an AWGorCDC 314, a TRPNRx 335, an input power detecting unit. 336, an output target value calculating unit. 337, an AGC circuit 338, an input level information calculating unit 339, and a wavelength number information retaining unit 340. The OADM 330 further includes a Blockch loss setting unit 341, a Thruch loss calculating unit 342, an ASE correction value calculating unit 343, an SPL 344, an OCM. 345, an SPL, 346, a second PD 347, an output power detecting unit 348, and a coupler (CPL) 349. The OADM 330 further includes an AWGorCDC 350 and a TRPNTx 351.

The first optical amplifying unit 310 provides gain to transmission signals, thereby amplifying the transmission signals. The first LD 318 outputs excitation light to the first EDF 313 via the WDM 312. The first EDF 313 provides gain to the transmission signals with the output excitation light. Similarly, the second LD 319, the WDM 315, and the second EDF 316 also provide gain to the transmission signals. In a case where the gain flattening amount of the WSS 333 is insufficient, the GEQ. 314 flattens gain wavelength characteristics generated by the first EDF 313 and the second EDF 316.

The AGC circuit 338 controls excitation power in the first LD 318 and the second LD 319. The following describes the control on the excitation power performed by the AGC circuit 138. The first PD 317 receives transmission signals via the SPL 311. The input power detecting unit 336 detects power of all the signals (all signal power) of the transmission signals received by the first PD 317. The input power detecting unit 336 outputs the all signal power to the output target value calculating unit 337 and the input level information calculating unit 339.

The input level information calculating unit 339 acquires the all signal power from the input power detecting unit 336 and acquires wavelength number information from the wavelength number information retaining unit 340. The wavelength number information retained in the wavelength number information retaining unit 340 is the number of wavelengths included in the transmission signals, for example. The input level information calculating unit 339 calculates signal power Pin (dBm/ch) per wavelength from the all signal power and the wavelength number information. The input level information calculating unit 339 outputs the calculated signal power per wavelength to the output target value calculating unit 337.

The output target value calculating unit 337 subtracts the signal power Pin per wavelength from an output target value Pouttarget (dBm/ch) per wavelength, thereby calculating target gain Gtarget (dB). The output target value Pouttarget is a value set in advance. The output target value calculating unit 337 calculates the target gain Gtarget (dB) with Equation (2), for example.

$$Gtarget = Pouttarget - Pin \quad (2)$$

The output target value calculating unit 337 acquires all signal power Pintotal (dBm) from the input power detecting unit 336 and acquires a number Nblock of wavelengths to be blocked by the WSS 333 from the Blockch loss setting unit 341. The number Nblock of wavelengths to be blocked may be a value set in the device or may be calculated based on a spectrum measured by the OCM 332 and the OCM 345. The output target value calculating unit 337 calculates an output target value Pouttargettotal with Equation (3). The output target value calculating unit 337 outputs the calculated output target value Pouttargettotal to the AGC circuit 338.

$$Pouttargettotal = 10 * \log\left[10^{\wedge}(Gtarget + Pintotal)/10) - Nblock * (10^{\wedge}(Pouttarget/100))\right] \quad (3)$$

The AGC circuit 338 compares the output target value Pouttargettotal with an actual output power Pouttotal detected by the output power detecting unit 348. The actual output power Pouttotal is signal power at all the wavelengths of the transmission signals detected by the second PD 347. The AGC circuit 338 controls the excitation power in the first LD 318 and the second LD 319 such that the actual output power Pouttotal agrees with the output target value Pouttargettotal.

As described above, the AGC circuit 338 controls the excitation power in the first LD 318 and the second LD 319 such that the actual output power Pouttotal detected on the output side of the transmission signals agrees with the output target value Pouttarget total. With this configuration, in a case where the power of the transmission signals drastically fluctuates near the SPL 311, the AGC circuit 338 can control gain provided to the transmission signals at high speed.

The following describes a case where the output target value calculating unit. 337 calculates the output target value by predicting an influence of amplified spontaneous emission (ASE). ASE is optical noise generated in the transmission signals. ASE included in the transmission signals may possibly cause an error in the gain control performed by the AGC circuit 338. The following describes a process of calculating the output target value by predicting the influence of ASE.

The ASE correction value calculating unit 343 acquires signals other than the Block signal based on information received from the Blockch loss setting unit 341. Thus, the ASE correction value calculating unit. 343 calculates an ASE (dBm), which is an ASE correction value of the entire band, and an ASE,ch (dBm), which is an ASE correction value per wavelength. The ASE correction value calculating unit 343 outputs the calculated ASE correction value ASE of the entire band and the ASE correction value. ASE, ch per wavelength to the output target value calculating unit 337.

The output target value calculating unit 337 calculates the output target value. Pouttargettotal using ASE and ASE,ch with Equation (4). The AGC circuit 338 controls the excitation power in the first LD 315 and the second LD 319 such that the actual output power Pouttotal agrees with the output target value Pouttargettotal.

$$Pouttargettotal = 10 * \log\left[10^{\wedge}((Gtarget + Pintotal)/10) - Nblock * (10^{\wedge}(Pouttarget/10) + 10^{\wedge}(ASE,ch/10)) + 10^{\wedge}(ASE/10)\right] \quad (4)$$

The following describes the devices posterior to the SPL 331 of the OADM 330. The OCM 332 receives the transmission signals via the SPL 331 and measures signal power at each wavelength of the transmission signals. Similarly, the SPL 344 and the OCM 345 also measure the signal power at each wavelength of the transmission signals. Alternatively, one of the OCM 332 and the OCM 345 may measure the signal power at each wavelength of the transmission signals. The OCM 332 and the OCM. 345 may be provided as a tunable filter array and a PD. The tunable filter array may be provided by using liquid crystal on silicon (LCOS) or digital light processing (DIP, registered trademark), for example.

The WSS 333 outputs the signal at each wavelength included in the transmission signals to the AWGorCDC 334 or the SPL 344. The signal output to the AWGorCDC 334 by the WSS 333 corresponds to the Drop signal. The AWGorCDC 334 prepares for power adjustment and multiplexing and demultiplexing to receive the Drop signal. The TRPNRx 335 serves as a receiving section of a transceiver and receives the Drop signal from the WSS 333.

By contrast, the signal output to the SPL 344 by the WSS 333 corresponds to the Through signal. The WSS 333 causes the Through signal to pass therethrough toward the SPL 344. The SS 333 prevents the Block signal from being transmitted posterior to the WSS 333. The Blockch loss setting unit 341 provides, to the WSS 333, an attenuation amount to prevent the Block signal out of the transmission signals from being transmitted based on Block signal information. The Block signal information is a value set in the device, for example.

The Thruch loss calculating unit 342 calculates the amount of attenuation provided to the Through signal and outputs it to the WSS 333. The following describes calculation of the amount of attenuation provided to the Through signal. The input level information calculating unit 339 acquires the all signal power from the input power detecting unit 336 and acquires the wavelength number information from the wavelength number information retaining unit 340. Based on the all signal power and the wavelength number information, the input level information calculating unit 339 calculates signal power per wavelength and outputs it to the Thruch loss calculating unit 342.

The Thruch loss calculating unit 342 subtracts the signal power Pin per wavelength from the output target value Pouttarget (dBm/ch) per wavelength, thereby calculating the target gain Gtarget (dB). The Thruch loss calculating unit 342 refers to an attenuation amount table 10, which will be described later, thereby acquiring the attenuation amount at each wavelength corresponding to the target gain. Gtarget (dB). The Thruch loss calculating unit 342 outputs the acquired attenuation amount at each wavelength to the WSS 333. Based on the attenuation amount at each wavelength, the WSS 333 attenuates the signal at each wavelength included in the Through signal.

FIG. 8 is an example diagram of the attenuation amount table. As illustrated in the example in FIG. B, the attenuation amount table 10 associates a channel (ch), a wavelength (nm) corresponding to the channel, and the attenuation amount at the wavelength with one another. The attenuation amount at the wavelength is set for each target gain (dB). The attenuation amount table 10 indicates that, in a case where the target gain is 26 dB, the attenuation amounts provided to ch 1 to ch 10 are "5.4, 5.4, 5.4, 5.4, 5.3, 5.3, 5.2, 5.1, 5.0, and 4.8", respectively, for example. The Thruch loss calculating unit 342 acquires the amount of attenuation provided to each wavelength from the attenuation amount table 10 and outputs it to the WSS 333.

In a case where the WSS 333 controls signals at a number of wavelengths in a short time, control delay may possibly occur to cause fluctuations in another signal power. To prevent this, the WSS 333 controls the amount of attenuation provided to the Through signal at a speed not to affect another signal power.

The following describes the devices posterior to the SPL 346 of the OADM 330. The second PD 347 receives output signals via the SPL 346. The output power detecting unit 348 detects the all signal power of the output signals received by the second PD 347. The output power detecting unit 348 outputs the detected all signal power of the output signals to the AGC circuit 338. The all signal power of the output signals corresponds to the actual output power Pouttotal.

The TRPNTx 351 serves as a transmitting section of the transceiver. The AWGorCDC 350 adjusts the power of the signals transmitted from the TRPNTx 351 and performs multiplexing and demultiplexing. The CPL 349 multiplexes the signals transmitted from the AWGorCDC 350.

Alternatively, another MSS similar to the WSS 333 may be provided to multiplex the signals transmitted from the AWGorCDC 350.

Figure 9:
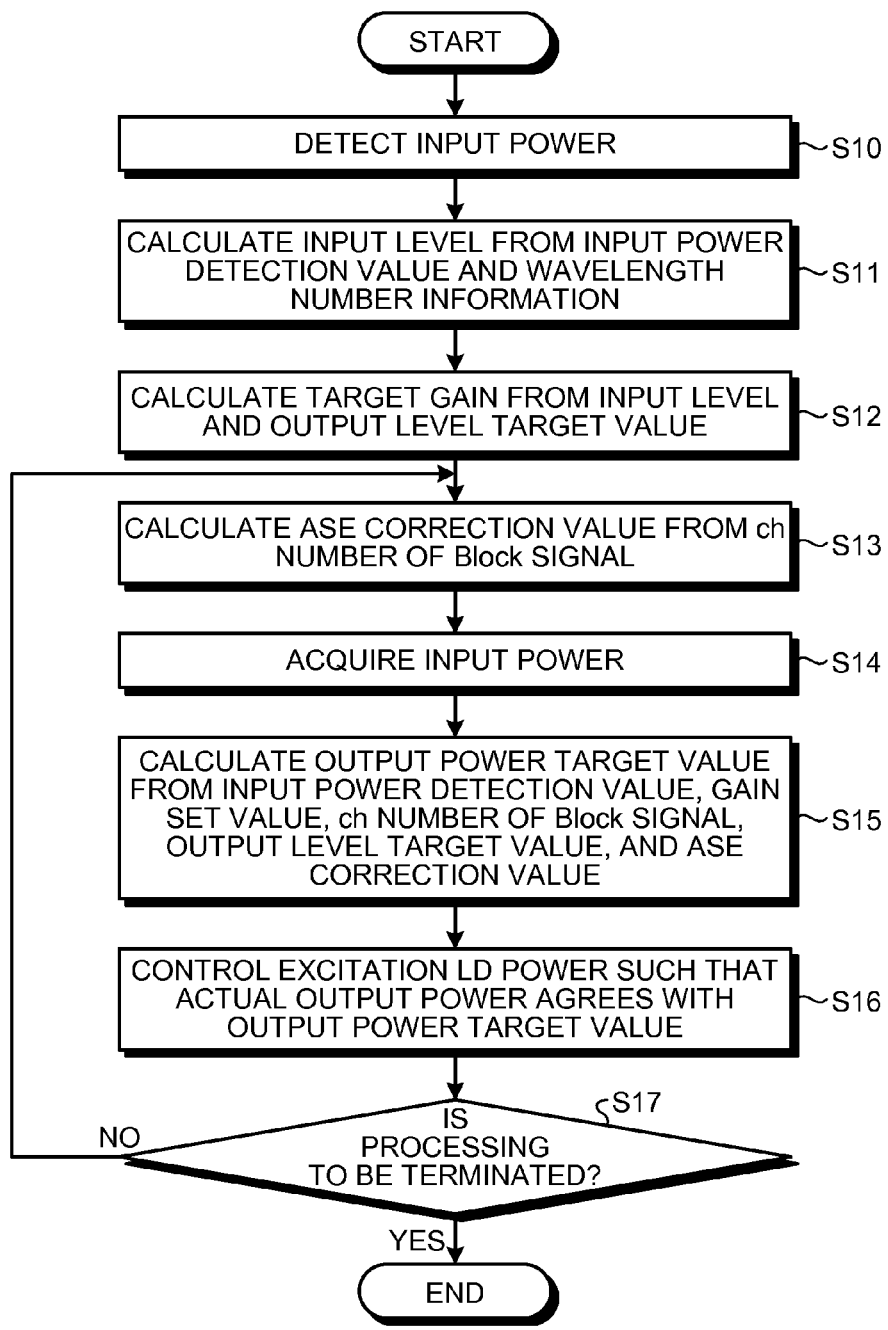
FIG. 9 is the first flowchart of a control flow of optical amplification.
Figure 10:
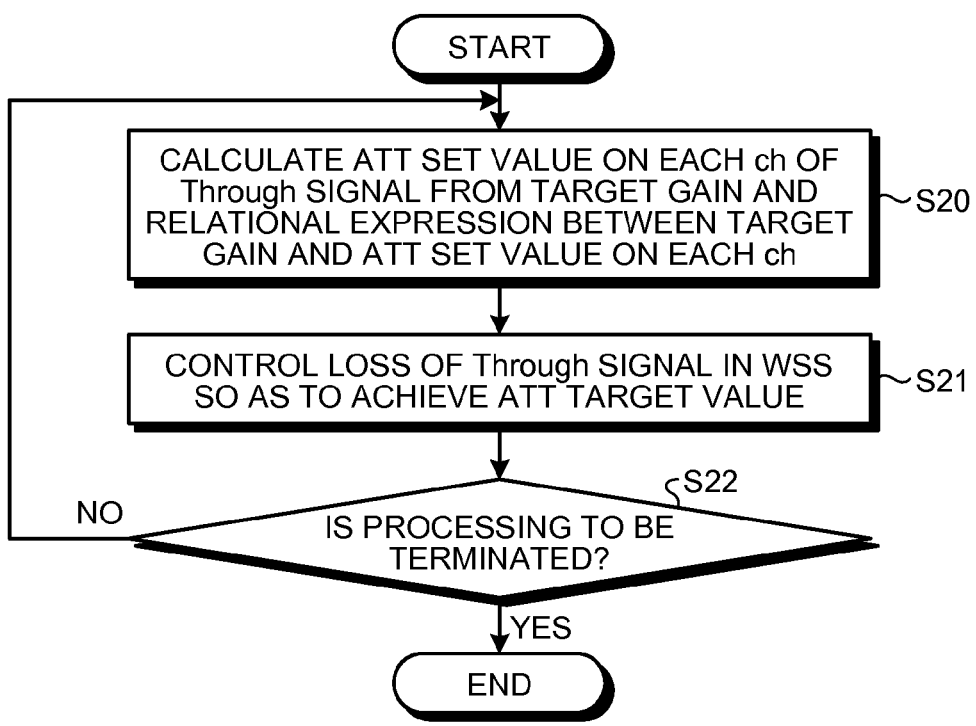
FIG. 10 is the second flowchart of the control flow of the optical amplification.

The following describes a control flow of optical amplification performed by the optical amplifier 300 with reference to FIGS. 9 and 10. FIG. 9 is the first flowchart of the control flow of the optical amplification. As indicated in the example in FIG. 9, the input power detecting unit 336 detects input power detected by the first PD 317 (Step S10). The input power corresponds to the all signal power Pintotal of the transmission signals, for example. The input level information calculating unit 339 calculates an input level from the input power detection value and wavelength number information (Step S11). The input level corresponds to the signal power Pin per wavelength, for example.

The output target value calculating unit 337 calculates target gain from the input level and an output level target value (Step 912). The output level target value corresponds to the output target value Pout target per wavelength. The output target value calculating unit 337, for example, subtracts the input level from the output level target value, thereby calculating the target gain.

The output target value calculating unit 337 calculates an ASE correction value from the ch number of the Block signal output from the Blockch loss setting unit 341 (Step S13). The output target value calculating unit 337 acquires the input power from the input power detecting unit 336 (Step S14). The output target value calculating unit 337 calculates an output power target value from the input power detection value, the gain set value, the ch number of the Block signal, the output level target value, and the ASE correction value (Step 915). The output target value calculating unit 337 calculates the output power target value with Equation (4), for example. The AGC circuit 338 controls excitation LD power such that an actual output power agrees with the output power target value (Step S16).

If the processing is to be terminated (Yes at Step S17), the optical amplifier 300 stops each processing unit. By contrast, if the processing is to be continued (No at Step S17), the optical amplifier 300 performs the processing at Step S13 again.

The following describes a flow of control on the attenuation amount at each wavelength performed by the Thruch loss calculating unit 342 with reference to FIG. 10. FIG. 10 is the second flowchart of the control flow of the optical amplification. As indicated in the example in FIG. 10, the Thrush loss calculating unit 342 calculates an ATT set value on each ch of the Through signal from the target gain and the relational expression between the target gain and the ATT set value on each ch (Step S20). The ATT set value on each ch corresponds to the amount of attenuation provided to each wavelength. The Thruch loss calculating unit 342, for example, acquires the amount of attenuation provided to each ch associated with the target gain in the attenuation amount table 10 illustrated in FIG. 8.

The Thrush loss calculating unit 342 controls loss of the Through signal in the WSS 333 so as to achieve the ATT target value (Step S21). The Thrush loss calculating unit 342, for example, controls the amount of attenuation provided to each wavelength of the Through signal in the WSS 333 based on the amount of attenuation provided to each ch output from the input level information calculating unit 339.

As described above, the function of the WSS 333 can eliminate the gain tilt occurring in the transmission signals. With this configuration, no VOA needs to be provided to the optical amplifier, making it possible to reduce the number of components and thus downsize the device.

[b] Second Embodiment

Example of an Optical Amplifier According to a Second Embodiment

An example of an optical amplifier according to a second embodiment will be described with reference to FIG. 11.

Figure 11:
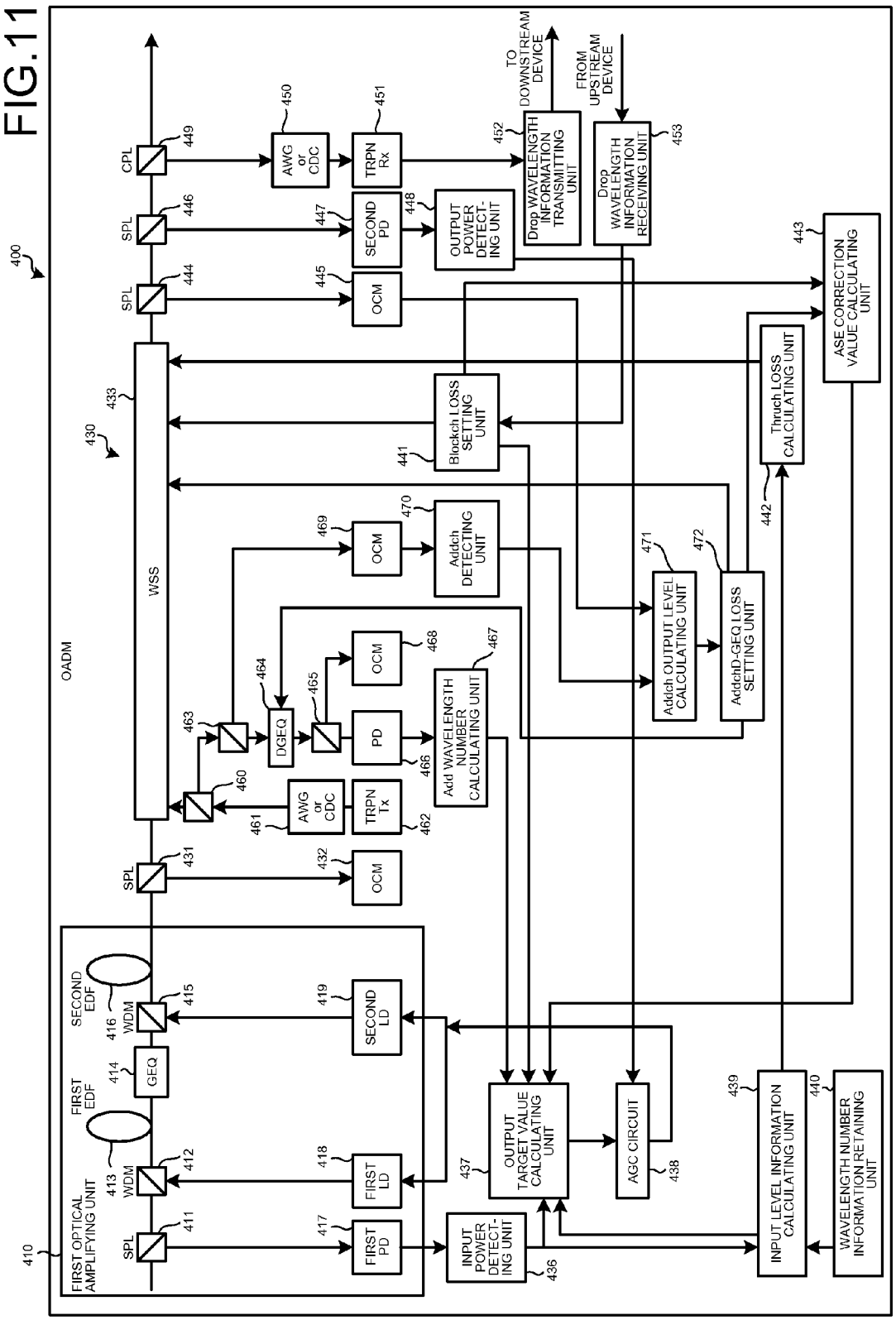
FIG. 11 is an example diagram of a configuration of an optical amplifier according to a second embodiment.

FIG. 11 is an example diagram of a configuration of the optical amplifier according to the second embodiment. As illustrated in the example in FIG. 11, an optical amplifier 400 includes a first optical amplifying unit 410 and an OADM 430. The first optical amplifying unit 410 includes an SPL 411, a WDM 412, a first EDF 413, a GEQ 414, a WDM 415, a second EDF 416, a first CD 417, a first LD 418, and a second LD 419. The OADM 430 includes an SPL 431, an OCM 432, a WSS. 433, an input power detecting unit 436, an output target value calculating unit 437, an AGC circuit 438, an input level information calculating unit 439, and a wavelength number information retaining unit 440. The OADM 430 further includes a Blockch loss setting unit 441, a Thruch loss calculating unit 442, an AST correction value calculating unit 443, an SPL 444, an OCM 445, an SPL. 446, second. PD 447, an output power detecting unit 448, and a CPL 449. The OADM. 430 further includes an AWGorCDC 450, a. TRPNRx 451, a Drop wavelength information transmitting unit 452, and a Drop wavelength information receiving unit 453. The OADM 430 further includes a CPL 460, an AWGorCDC 461, a TRPNTx 462, an SPL 463, a dynamic gain equalizer (DGEQ) 464, an SPL 465, and a PD 466. The OADM 430 further includes an Add wavelength number calculating unit 467, an OCM 468, an OCM 469, an Addch detecting unit 470, an Addch output level calculating unit 471, and an AddchD-CEQ loss setting unit 472. The devices identical to those of the first embodiment are denoted by numbers with the last two digits identical to those of the first embodiment, and explanation thereof will be appropriately omitted.

The following describes an Add signal added by the WSS 433. The TRPNTx 462 serves as the transmitting section of the transceiver. The TRPNTx 462 outputs an Add signal to the AWGorCDC 461. The AWGorCDC 461 adjusts power of the Add signal received from the TRPNTx 462 and multiplexes and demultiplexes the Add signal. The CPL 460 multiplexes the transmission signals with the Add signal in the WSS 433.

The CPL 460 outputs a part of the Add signal to the SPL 463. The SPL 463 splits and outputs the Add signal to the DGEQ 464 and the OCM 469. The following describes processing performed on the Add signal output to the DGEQ 464 and processing performed on the Add signal output to the OCM 469.

The processing performed on the Add signal output to the DGEQ 464 will be described. The DGEQ 464 is controlled so as to cause the signal to pass therethrough in conjunction with the multiplexing of the Add signal in the WSS 433 with the attenuation amount of the Add signal alone set to 0. The DGEQ 464 may be a wavelength blocker (WB) that prevents a wavelength from passing therethrouqh, for example. The PD 466 detects signal power passing through the DGEQ 464 and outputs it to the Add wavelength number detecting unit 467. The Add wavelength number detecting unit 467 calculates a number Nadd of wavelengths of the Add signal using the signal power Padd passing through the DGEQ 464 and specified power Pchadd per wavelength with Equation (5). The specified power Pchadd per wavelength may be a value set in the device, for example, or may be calculated from a measured value of each wavelength resulting from measuring performed by the OCM 468. The Add wavelength number detecting unit 467 outputs the number Nadd of wavelengths of the Add signal to the output target value calculating unit 437.

$$Nadd = Padd/Pchadd \quad (5)$$

Because the DGEQ 464 in the example in FIG. 11 is arranged on the input side of the Add signal, the Add wavelength number detecting unit 467 can accurately calculate the number Nadd of wavelengths of the Add signal in a case where the Add signal is suddenly input. This configuration can prevent an error in the output target value calculated by the output target value calculating unit 437.

The Add wavelength number detecting unit 457 calculates the number Nadd of wavelengths of the Add signal using the signal power detected by the PD 466. Thus, the output target value calculating unit 437 can accurately calculate the output target value using the number Nadd of wavelengths of the Add signal in a case where the Add signal drastically changes. Therefore, the AGC circuit 436 can optimally control the gain provided to the transmission signals using the calculated output target value in a case where the Add signal drastically changes.

The processing performed on the Add signal output to the OCM 459 will be described. The OCM 469 measures the power at each wavelength and outputs the measurement data to the Addch detecting unit 470. The Addch detecting unit 470 detects the power at each wavelength of the Add signal from the measurement data and outputs it to the Addch output level calculating unit 471. The Addch output level calculating unit 471 outputs the measurement result of the power at each wavelength in the OCM 469 and the OCM 445 to the AddchD-GEQ loss setting unit 472.

The AddchD-GEQ loss setting unit 472 simultaneously controls the WSS 433 and the DGEQ 464 at a slow speed such that the Add signal is slowly multiplexed with the transmission signals. This mechanism can prevent delay in control on each block in a case where the power drastically fluctuates in the Add signal.

The following describes calculation of the output target value. The output target value calculating unit. 437 subtracts the signal power Pin per wavelength output from the input level information calculating unit 439 from the output target value Pouttarget (dBm/ch) per wavelength, thereby calculating the target gain Gtarget (dB). The target gain Gtarget (dB) can be calculated by Equation (2), for example.

The output target value calculating unit 437 acquires the all signal power Pintotal (dBm) from the input power detecting unit 436 and acquires the number Nblock of wavelengths to be blocked by the WSS 433 from the Blockch loss setting unit 441. The output target value calculating unit 437 acquires the number Nadd of wavelengths to be added from the Add wavelength number calculating unit 467. The Blockch loss setting unit 441 receives the number Nblock of wavelengths to be blocked from an upstream device via the Drop wavelength information receiving unit 453.

The output target value calculating unit 437 calculates the output target value Pouttargettotal (dBm) using the number Nblock of wavelengths to be blocked, the number. Nadd of wavelengths to be added, the target gain Gtarget, the output target value Pouttarget per wavelength, and the all signal power Pintotal with Equation (6). The AGC circuit 438 controls the excitation power in the first LD 418 and the second LD 419 such that the actual output power Pouttotal agrees with the calculated output target value Pouttargettotal. The output target value Pouttarget per wavelength is a value set in the device, for example.

$$Pouttargettotal = 10*\log[10^{((Gtarget+Pintotal)-(Nblock-Nadd)*10^{(Pouttarget/10)}}] \quad (6)$$

To calculate the output target value by predicting the influence of ASE, the output target value calculating unit 437 acquires the ASE correction value ASE (dBm) of the entire band and the ASE correction value ASE,ch (dBm) per wavelength output from the ASE correction value calculating unit 443. The output target value calculating unit 437 calculates the output target value Pouttargettotal (dBm) using the ASE correction value ASE (dBm) of the entire band and the ASE correction value ASS, ch (dBm) per wavelength with Equation (7). The output target value calculating unit 437 outputs the output target value Pouttargettotal to the AGC circuit 438.

$$Pouttargettotal=10*\log [10^{\wedge}((Gtarget+Pintotal)/10)-(Nblock-Nadd)*10^{\wedge}(Pouttarget/10)-(Nblock*10^{\wedge}(ASE,ch/10))+10^{\wedge}(ASE/10)] \quad (7)$$

The following describes the devices posterior to the CPL 449 of the optical amplifier 400. The CPI, 449 outputs a part of the transmission signals to the AWGorCDC 450. The AWGorCDC 450 adjusts power and performs multiplexing and demultiplexing on the received transmission signals so as to allow a downstream device to receive them. The AWGorCDC 450 then outputs the transmission signals to the TRPNRx 451. The Drop wavelength information transmitting unit 452 acquires information on a wavelength to be dropped from the TRPNRx 451 and transmits it to the downstream device.

The Drop wavelength information receiving unit 453 receives information on a wavelength to be blocked from the upstream device and outputs it to the Blockch loss setting unit 441. The Blockch loss setting unit 441 generates a Block signal based on the information on a wavelength to be blocked and outputs it to the WSS 433.

Figure 12:
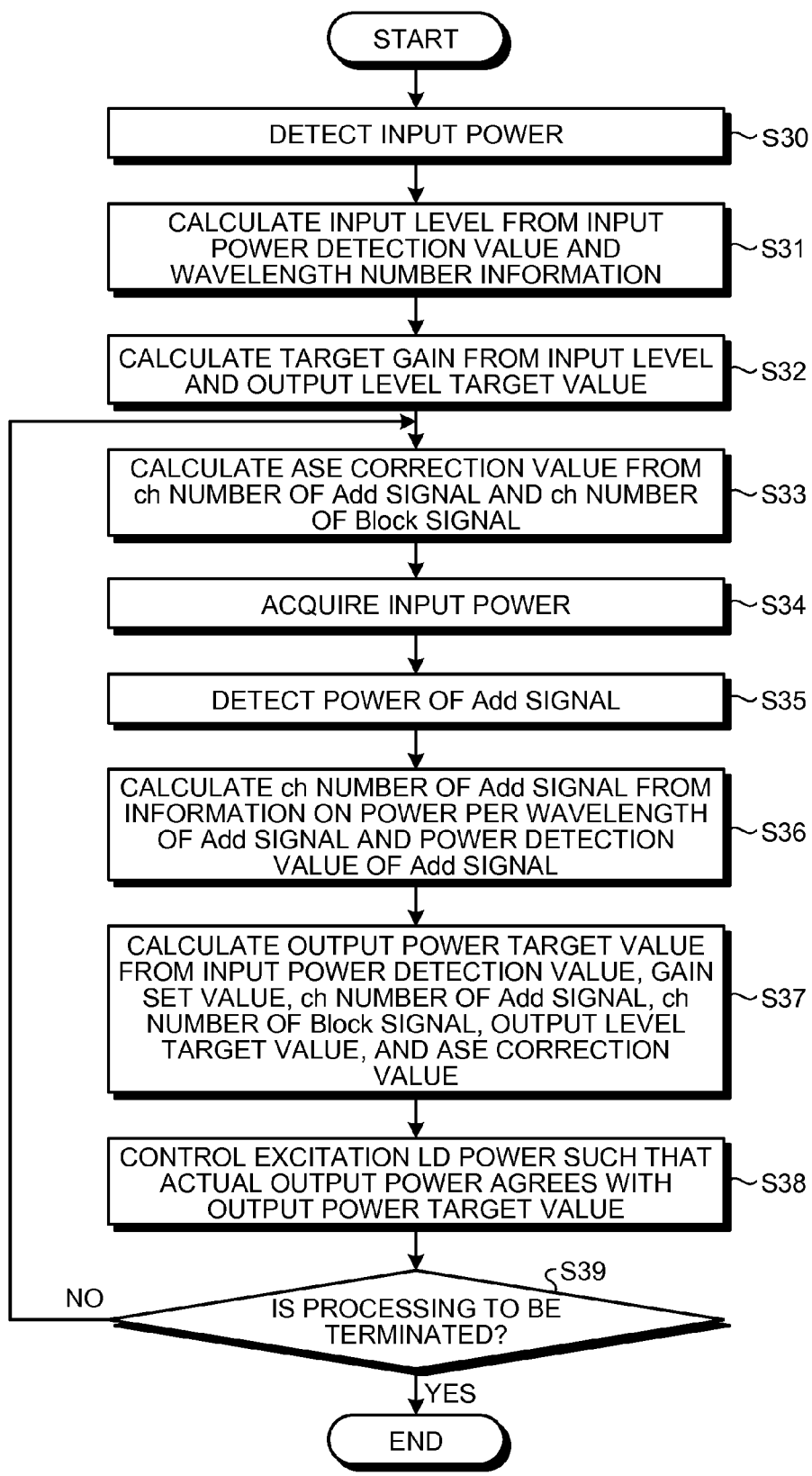
FIG. 12 is the third flowchart of the control flow of the optical amplification.

The following describes a control flow of optical amplification performed by the optical amplifier 400 with reference to FIGS. 12 to 15. FIG. 12 is the third flowchart of the control flow of the optical amplification. As indicated in the example in FIG. 12, the input, power detecting unit 436 detects input power detected by the first PD 417 (Step S30). The input power corresponds to the all signal power of the transmission signals, for example. The input level information calculating unit 439 calculates an input level from the input power detection value and wavelength number information (Step. S31). The input, level corresponds to the signal power per wavelength, for example. The output target value calculating unit 437 calculates target gain from the input level and an output level target value (Step S32). The output level target value corresponds to the output target value per wavelength, for example.

The output target value calculating unit 437 calculates an ASE correction value from the ch number of the Add signal output from the Add wavelength number calculating unit 467 and the ch number of the Block signal output from the Blockch loss setting unit 441 (Step S33). The output target value calculating unit 437 acquires the input power from the input power detecting unit 436 (Step S34). The PD 466 detects the power of the Add signal (Step 935) The Add wavelength number calculating unit 467 calculates the ch number of the Add signal from information on the power per wavelength of the Add signal and the power detection value of the Add signal (Step S36). The Add wavelength number calculating unit 467 calculates the ch number of the Add signal with Equation (5), for example. The information on the power per wavelength of the Add signal corresponds to the specified power per wavelength, for example. The power detection value of the Add signal corresponds to the signal power passing through the DGEQ 464, for example.

The output target value calculating unit 437 calculates an output power target value from the input power detection value, the gain set value, the ch number of the Add signal, the ch number of the Block signal, the output level target value, and the ASE correction value (Step S37). The output level target value corresponds to the output target value per wavelength, for example. The AGC circuit 438 controls excitation ID power such that an actual output power agrees with the output power target value (Step 938).

If the processing is to be terminated (Yes at Step S39), the optical amplifier 400 stops each processing unit. By contrast, if the processing is to be continued No at Step S39), the optical amplifier 400 performs the processing at Step S33 again.

Figure 13:
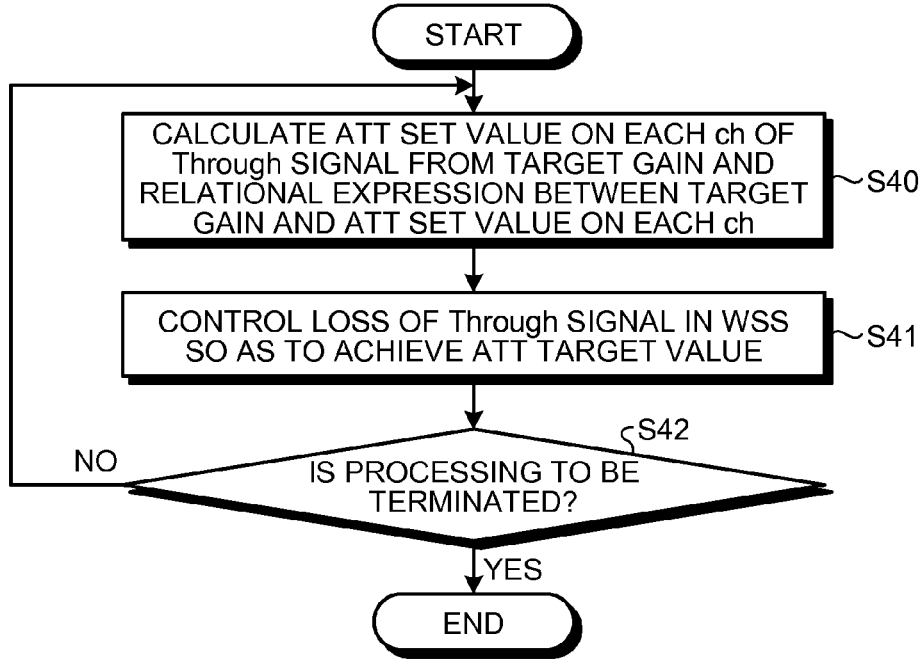
FIG. 13 is the fourth flowchart of the control flow of the optical amplification.

The following describes a flow of control on the attenuation amount at each wavelength performed by the Thruch loss calculating unit 442 with reference to FIG. 13. FIG. 13 is the fourth flowchart of the control flow of the optical amplification. As indicated in the example in FIG. 13, the Thruch loss calculating unit 442 calculates an ATT set value on each ch of the Through signal from the target gain and the relational expression between the target gain and the ATT set value on each ch (Step S40). The Thruch loss calculating unit 442, for example, refers to the attenuation amount table 10 illustrated in FIG. 8, thereby acquiring the ATT set value. The ATT set value on each ch corresponds to the amount of attenuation provided to each wavelength.

The Thruch loss calculating unit 442 controls loss of the Through signal in the WSS 433 so as to achieve the ATT target value (Step S41). The Thruch loss calculating unit 442 performs control in the same manner as that of the Thruch loss calculating unit 342, for example.

If the processing is to be terminated (Yes at Step S42), the optical amplifier 400 stops each processing unit. By contrast, if the processing is to be continued (No at Step S42), the optical amplifier 400 performs the processing at Step S40 again.

Figure 14:
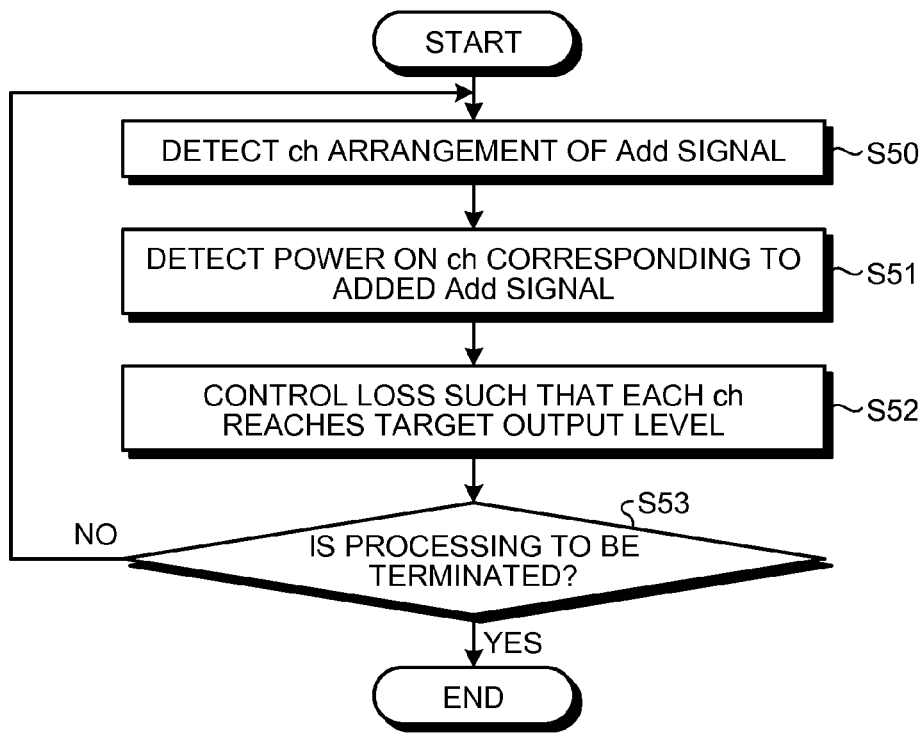
FIG. 14 is the fifth flowchart of the control flow of the optical amplification.

The following describes loss control performed by the AddchD-GEQ loss setting unit 472 with reference to FIG. 14. FIG. 14 is the fifth flowchart of the control flow of the optical amplification. The Addch detecting unit 470 detects the ch arrangement of the Add signal based on the detection result of the OCM 469 (Step S50). The Addch output level calculating unit 471 detects the power on the ch corresponding to the added Add signal out of the transmission signals detected by the OCM 445 (Step S51).

The AddchD-GEQ loss setting unit 472 controls loss such that each ch of the transmission signals detected by the OCM 445 reaches the target output level (Step S52).

If the processing is to be terminated (Yes at Step S53), the optical amplifier 400 stops each processing unit. By contrast, if the processing is to be continued (No at Step S53), the optical amplifier 400 performs the processing at Step S50 again.

Figure 15:
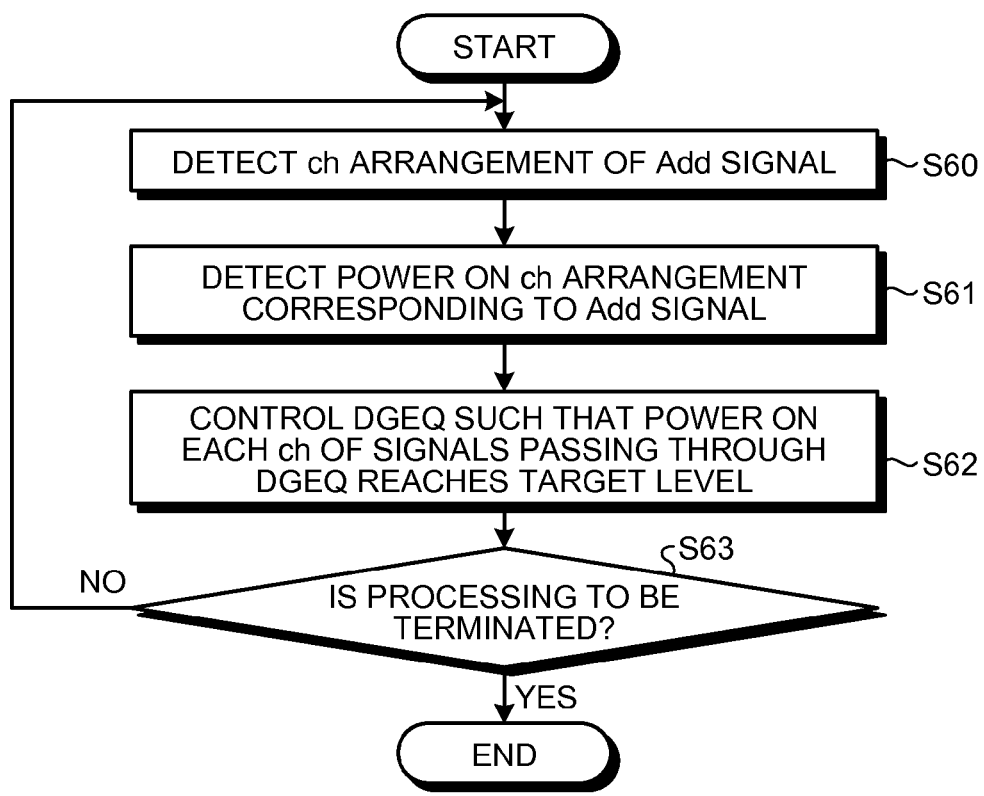
FIG. 15 is the sixth flowchart of the control flow of the optical amplification.

The following describes loss control performed by the DGEQ 464 with reference to FIG. 15. FIG. 15 is the sixth flowchart of the control flow of the optical amplification. The Addch detecting unit 470 detects the ch arrangement of the Add signal (Step S60). The Addch output level calculating unit 471 detects the power on the ch arrangement corresponding to the Add signal (Step S61).

The AddchD-GEQ loss setting unit 472 controls the DGEQ 464 such that the power on each ch of the signals passing through the DGEQ. 464 reaches the target level (Step S62).

If the processing is to be terminated (Yes at Step S63), the optical amplifier 400 stops each processing unit. By contrast, if the processing is to be continued (No at Step S63), the optical amplifier 400 performs the processing at Step S60 again.

As described above, the output target value calculating unit 437 calculates the output target value Pouttargettotal using the number Nblock of wavelengths to be blocked, the number Nadd of wavelengths to be added, and the like. Thus, the output target value calculating unit 437 can accurately calculate the output target value in a case where the Add signal and the Block signal are generated in the WSS 433. This mechanism can appropriately control the gain provided to the transmission signals based on the output target value.

[c] Third Embodiment

Example of an Optical Amplifier According to a Third Embodiment

Figure 16:
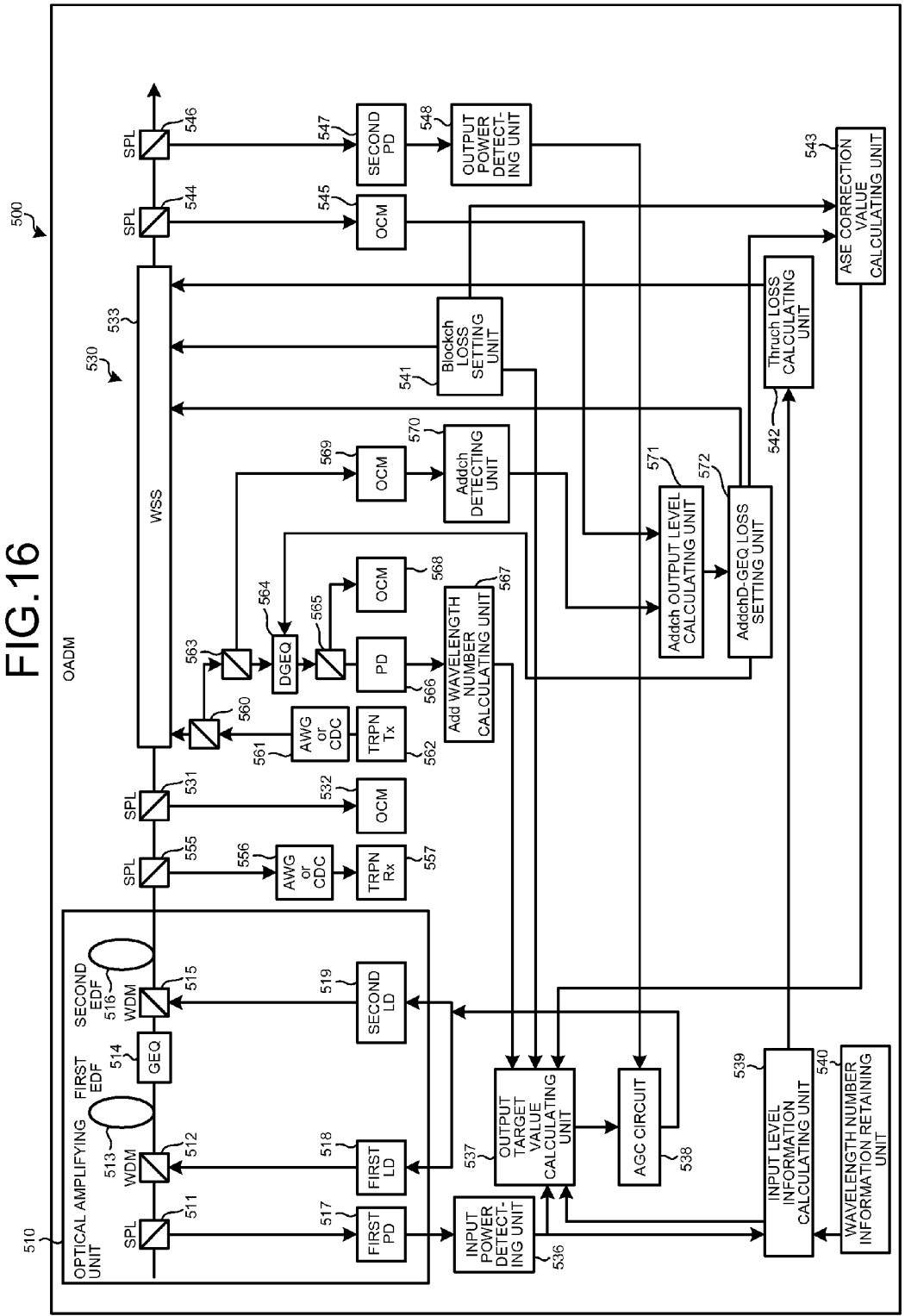
FIG. 16 is an example diagram of a configuration of an optical amplifier according to a third embodiment.

An example of an optical amplifier according to a third embodiment will be described with reference to FIG. 16. FIG. 16 is an example diagram of a configuration of the optical amplifier according to the third embodiment. As illustrated in the example in FIG. 16, an optical amplifier 500 includes an optical amplifying unit 510 and an OADM 530. The optical amplifying unit 510 includes an SPL 511, a WDM 512, a first EDF 513, a GEQ 514, a WDM 515, a second EDF 516, a first PD 517, a first LD 518, and a second LD 519. The OADM 530 includes an SPL 555, an AWGorCDC 556, a TRPNRx 557, an SPL 531, an OCM 532, and a WSS 533. The OADM 530 further includes an input power detecting unit 536, an output target value calculating unit 537, an AGC circuit 538, an input level information calculating unit 539, and a wavelength number information retaining unit 540. The OADM 530 further includes a Blockch loss setting unit 541, a Thruch loss calculating unit 542, an ASE correction value calculating unit 543, an SPL 544, an OCM 545, an SPL 546, a second PD 547, and an output power detecting unit 548. The OADM 530 further includes a CPL 560, an AWGorCDC 551, a TRPNTx 552, an SPL 563, a DGEQ 564, an SPL 565, and a PD 566, an Add wavelength number calculating unit 567, an OCM 568, an OCM 569, and an Addch detecting unit 570. The OADM 530 further includes an Addch output level calculating unit 571 and an AddchD-GEQ loss setting unit 572. The devices identical to those of the first embodiment or the second embodiment are denoted by numbers with the last two digits identical to those of the first embodiment or the second embodiment, and explanation thereof will be appropriately omitted.

Because the optical amplifying unit 510 is the same as the first optical amplifying unit 310 according to the first embodiment, explanation thereof will be omitted. Because output to the WSS 533 is performed in the same manner as that of the output to the WSS 433 according to the second embodiment, explanation thereof will be omitted. While the second embodiment transmits the information on the wavelength to be dropped to another device, the third embodiment blocks a Drop signal in the WSS 533.

The optical amplifier 500 drops the Drop signal in the SPL 555 and then receives an Add signal in the WSS 533.

The following describes calculation of the output target value. The output target value calculating unit 537 subtracts the signal power Pin per wavelength output from the input level information calculating unit 539 from the output target value Pouttarget (dBm/ch) per wavelength, thereby calculating the target gain Gtarget (dB). The target gain. Gtarget (dB) can be calculated by Equation (2), for example.

The output target value calculating unit 537 acquires the all signal power Pintotal (dBm) from the input power detecting unit. 536 and acquires the number Nblock of wavelengths to be blocked from the Blockch loss setting unit 541. The output target value calculating unit 537 also acquires the number Nadd of wavelengths to be added from the Add wavelength number calculating unit 567.

The output target value calculating unit 537 calculates the output target value Pouttargettotal (dBm) using the number Nblock of wavelengths to be blocked, the number Nadd of wavelengths to be added, the target gain Gtarget, the all signal power Pintotal, and the output target value Pouttarget per wavelength with Equation (8). The AGC circuit 538 controls the excitation power in the first. LD 518 and the second LD 519 such that the actual output power Pouttotal agrees with the output target value Pouttargettotal.

$$Pouttargettotal=10*\log [10^{((Gtarget+Pintotal)/10)}- (Nblock-Nadd)*10^{(Pouttarget/10)}] \quad (8)$$

Similarly to the first embodiment or the second embodiment, the output target value calculating unit 537 may acquire the ASE correction value from the ASE correction value calculating unit 543 and calculate the output target value by predicting the influence of ASE.

Thus, the output target value calculating unit 537 can accurately calculate the output target value in a case where the Add signal and the Block signal are generated.

[d] Fourth Embodiment

Example of an Optical Amplifier According to a Fourth Embodiment

Figure 17:
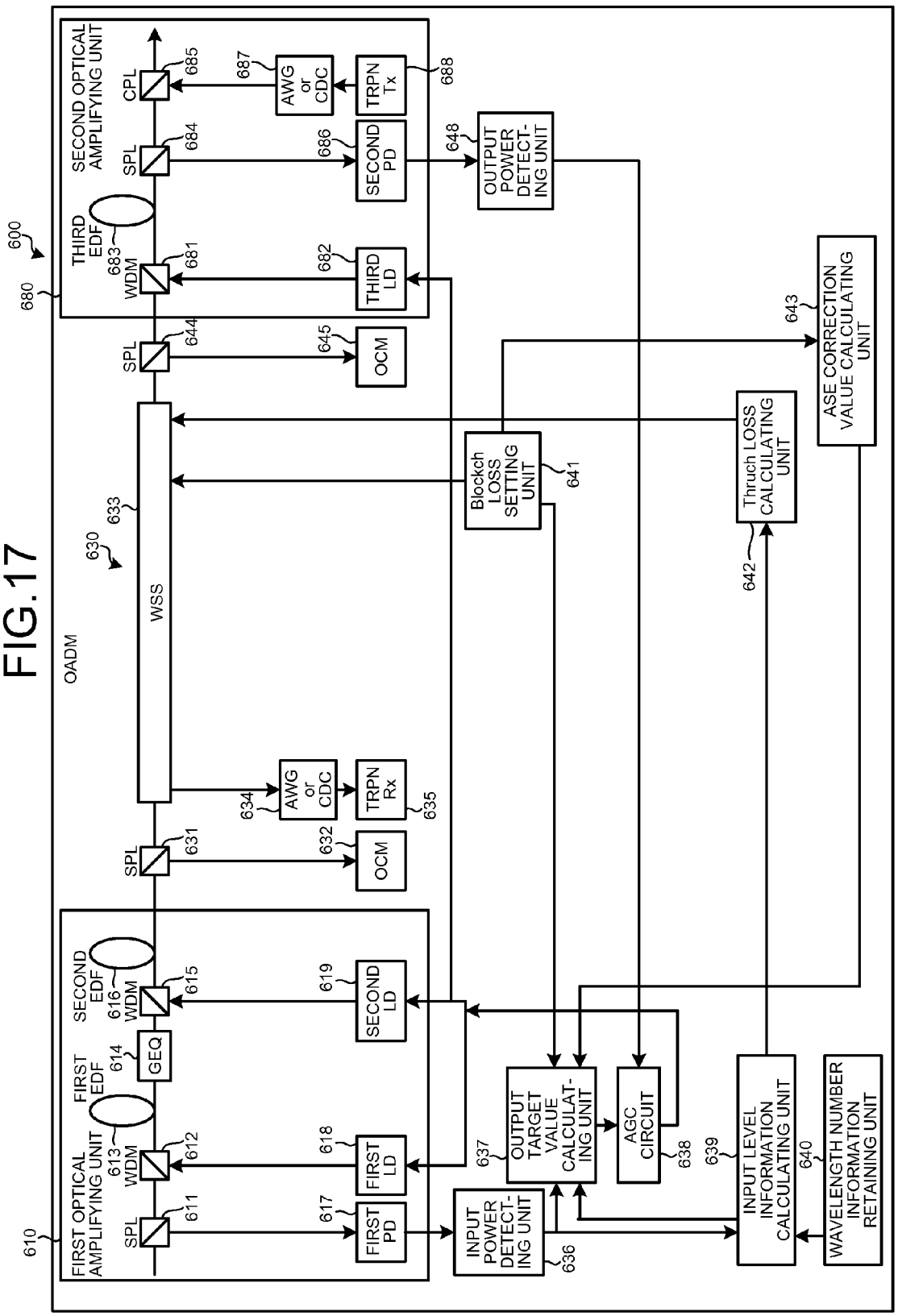
FIG. 17 is en example diagram of a configuration of an optical amplifier according to a fourth embodiment.

An example of an optical amplifier according to a fourth embodiment will be described with reference to FIG. 17. FIG. 17 is an example diagram of a configuration of the optical amplifier according to the fourth embodiment. As illustrated in the example in FIG. 17, an optical amplifier 600 includes a first optical amplifying unit 610, an OADM 630, and a second optical amplifying unit 680. The first optical amplifying unit 610 includes an SPL 611, a WDM 612, a first. EDF 613, a GEQ. 614, a WDM 615, a second BPS 616, a first PD 617, a first LD 618, and a second LD 619. The OADM 630 includes an SPL 531, an OCM 632, a WSS 633, an AWGorCDC 634, and a TRPNRx 635. The OADM 630 further includes an input power detecting unit 636, an output target value calculating unit 637, an AGC circuit 638, an input level information calculating unit 639, and a wavelength number information retaining unit 640. The OADM 630 further includes a. Blockch loss setting unit 641, a Thruch loss calculating unit 642, an AGE correction value calculating unit 643, an SPL 544, an OCM 645, and an output power detecting unit 648. The second optical amplifying unit 660 includes a WDM 681, a third LD 662, a third EDF 683, an SPL 684, a CPL 685, a second PD 686, an AWGorCDC 687, and a TRPNTx 688. The devices identical to those of the first to the third embodiments are denoted by numbers with the last two digits identical to those of the first to the third embodiments, and explanation thereof will be appropriately omitted.

Because the first optical amplifying unit 610 is the same as the first optical amplifying unit 310 according to the first embodiment, explanation thereof will be omitted. Because output to the WSS 633 is performed in the same manner as that of the output to the WSS 333 according to the first embodiment, explanation thereof will be omitted. While the first embodiment includes one optical amplifying unit, the fourth embodiment includes two optical amplifying units.

The following describes calculation of the output target value. The output target value calculating unit 637 subtracts the signal power Pin (dBm/ch) per wavelength from the output target value Pout target (dBm/ch) per wavelength, thereby calculating the target gain Gtarget (dB). The target gain Gtarget (dB) can be calculated by Equation (2), for example.

The output target value calculating unit 637 acquires the all signal power Pintotal (dBm) from the input power detecting unit 636 and acquires the number Nblock of wavelengths to be blocked by the WSS 633 from the Blockch loss setting unit 641.

The output target value calculating unit 537 calculates the output target value Pouttargettotal (dBm) using the number Nblock of wavelengths to be blocked, the target gain Gtarget, the all signal power Pintotal, and the output target value Pouttarget per wavelength with Equation (9). The AGC circuit 638 controls the excitation power in the first LD 616, the second LD 619, and the third LD 662 such that the actual output power Pouttotal agrees with the output target value Pouttargettotal.

$$Pouttargettotal=10*\log\,[10\textasciicircum((Gtarget+Pintotal)/10)-Nblock*10\textasciicircum(Pouttarget/10)] \quad (9)$$

Similarly to the first embodiment or the second embodiment, the output target value calculating unit 637 may acquire the AST correction value from the AGE correction value calculating unit. 643 and calculate the output target value by predicting the influence of ASS.

Given G1 is gain of the first optical amplifying unit 610 and G2 is gain of the second optical amplifying unit 680, the AGC circuit 638 may set the ratio between G1 and G2. The AGC circuit 638 may control the excitation power supplied to the first optical amplifying unit 610 and the second optical amplifying unit 660 based on the set ratio. The AGC circuit 638 may integrate a measured value of the OCM 632, thereby calculating the total output power from the first optical amplifying unit 610. The AGC circuit 638 may use the calculated total output power to adjust the ratio between G1 and G2.

Thus, the AGC circuit 636 can accurately control the gain in each of the optical amplifying units using the calculated output target value in a case where the optical amplifying units are arranged before and after the WSS.

[e] Fifth Embodiment

Example of an Optical Amplifier According to a Fifth Embodiment

Figure 18:
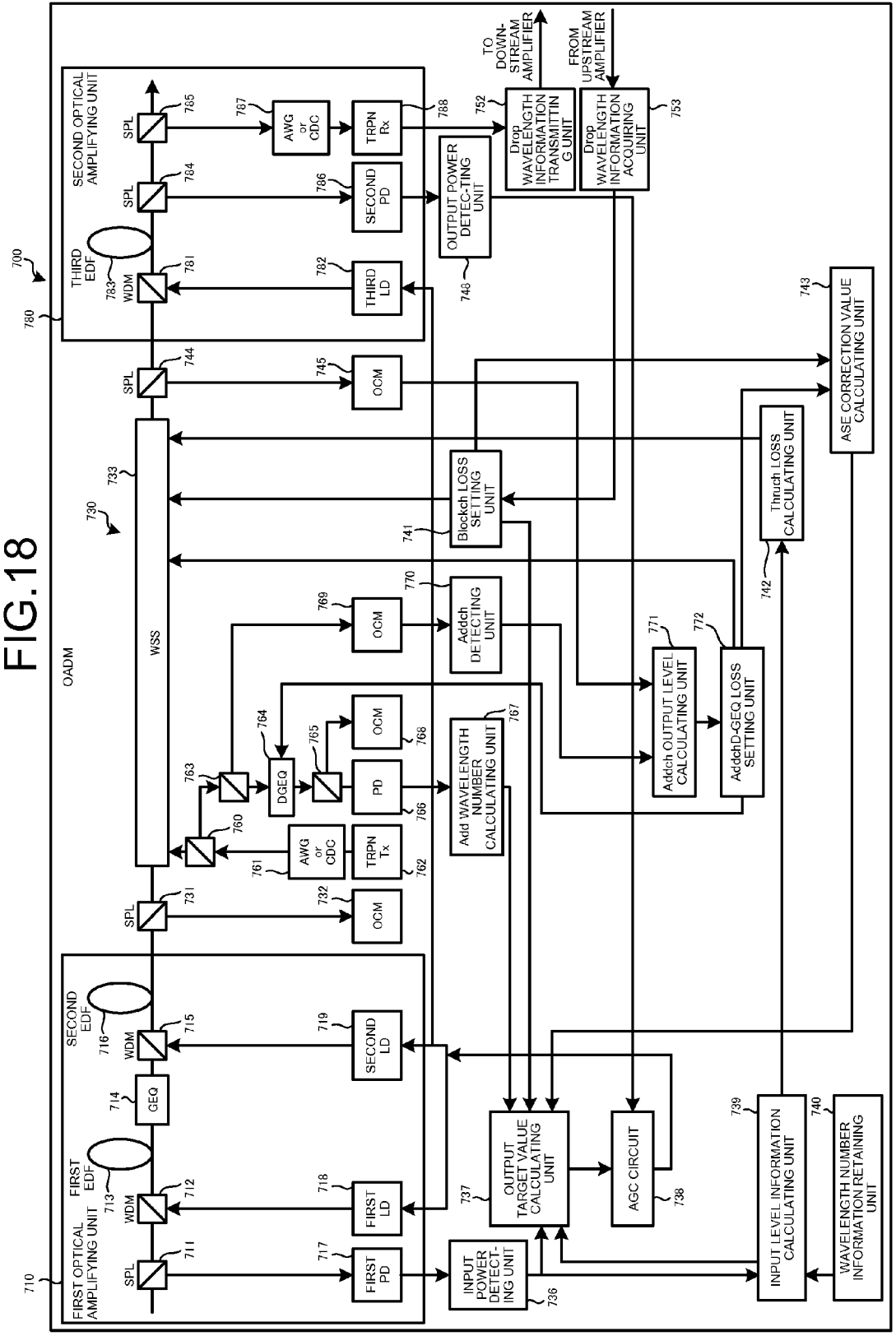
FIG. 18 is an example diagram of a configuration of an optical amplifier according to a fifth embodiment.

An example of an optical amplifier according to a fifth embodiment will be described with reference to FIG. 18. FIG. 18 is an example diagram of a configuration of the optical amplifier according to the fifth embodiment. As illustrated in the example in FIG. 18, an optical amplifier 700 includes a first optical amplifying unit 710, an OADM 730, and a second optical amplifying unit 780. The first optical amplifying unit 710 includes an SPL 711, a WDM 712, a first EDF 713, a GEQ 714, a WDM 715, a second EDF 716, a first PD 717, a first LD 718, and a second ID 719. The OADM 730 includes an SPL 731, an OCM 732, a WSS 33, an input power detecting unit 736, an output target value calculating unit 737, an AGC circuit 738, an input level information calculating unit 739, and a wavelength number information retaining unit 740. The OADM 730 further includes a Blockch loss setting unit 741, a. Thruch loss calculating unit 742, an ASE correction value calculating unit 743, an SPL 744, an OCM. 745, and an output power detecting unit 748. The OADM 730 further includes a. CPL 760, an AWGorCDC 761, a TRPNTx 762, an SPL 763, a DGEQ 764, an SPL 765, and a PD 766, an Add wavelength number calculating unit 767, an OCM 769, an OCM. 769, and an Addch detecting unit 770. The OADM 730 further includes an Addch output level calculating unit 771, an AddchD-GEQ loss setting unit 772, a Drop wavelength information transmitting unit 752, and a Drop wavelength information acquiring unit 753. The second optical amplifying unit. 780 includes a WDM 781, a third LD 782, a third EDF 783, an SPL 784, an SPL 785, a second PD 786, an AWGorCDC 787, and a TRPNRx 788. The devices identical to those of the first embodiment or the second embodiment are denoted by numbers with the last two digits identical to those of the first embodiment or the second embodiment, and explanation thereof will be appropriately omitted.

Because the first optical amplifying unit 710 is the same as the first optical amplifying unit 310 according to the first embodiment, explanation thereof will be omitted. Because output to the WSS 733 is performed in the same manner as that of the output to the WSS 433 according to the second embodiment, explanation thereof will be omitted. While the second embodiment includes one optical amplifying unit, the fifth embodiment includes two optical amplifying units.

The following describes calculation of the output target value. The output target value calculating unit 737 subtracts the signal power Pin (dBm/ch) per wavelength from the output target value Pouttarget (dBm/ch) per wavelength, thereby calculating the target gain Gtarget (dB). The target gain Gtarget (dB) can be calculated by Equation (2), for example.

The output target value calculating unit 737 acquires the all signal power Pintotal (dBm) from the input power detecting unit 736 and acquires the number Nblock of wavelengths to be blocked by the WSS 733 from the Blockch loss setting unit 741. The output target value calculating unit 737 also acquires the number Nadd of wavelengths to be added from the Add wavelength number calculating unit 767. The Blockch loss setting unit 741 receives the number Nblock of wavelengths to be blocked, that is, information on wavelengths to be blocked from an upstream amplifier via the Drop wavelength information acquiring unit 753.

The output target value calculating unit 737 calculates the output target value Pouttargettotal (dBm) using the number Nblock of wavelengths to be blocked, the number Nadd of wavelengths to be added, the target gain Gtarget, the all signal power Pintotal, and the output target value Pouttarget per wavelength with Equation (10).

$$Pouttargettotal=10*\log\,[10\textasciicircum((Gtarget+Pintotal)/10)-(Nblock-Nadd)*10\textasciicircum(Pouttarget/10)] \quad (10)$$

Similarly to the first embodiment or the second embodiment, the output target value calculating unit 737 may acquire the ASE correction value from the ASE correction value calculating unit 743 and calculate the output target value by predicting the influence of ASS.

Given G1 is gain provided by the first optical amplifying unit 710 and G2 is gain provided by the second optical amplifying unit 780, the AGC circuit 738 calculates G1 and G2 with Equation (11) and Equation (12). Nthrough is the number of Through signals passing through the WSS 733. Padd is power of the Add signal passing through the DGEQ 764.

$$G2 = 10*\log[10^{(Pouttargettotal/10)} - Nthrough*(10^{(Pouttarget/10)}) - Padd] \quad (11)$$

$$G1 = Gtarget - G2 \quad (12)$$

The AGC circuit 738 may calculate the number Nthrough of Through signals by subtracting the number block of wavelengths to be blocked and the number Nadd of wavelengths to be added from the number of all the signals. Alternatively, the optical amplifier 700 may acquire the number Nthrough of Through signals from the upstream amplifier.

Thus, the AGC circuit 738 can accurately control the gain in each of the optical amplifying units using the calculated output target value in a case where the optical amplifying units are arranged before and after the WSS.

[f] Sixth Embodiment

Example of an Optical Amplifier According to a Sixth Embodiment

Figure 19:
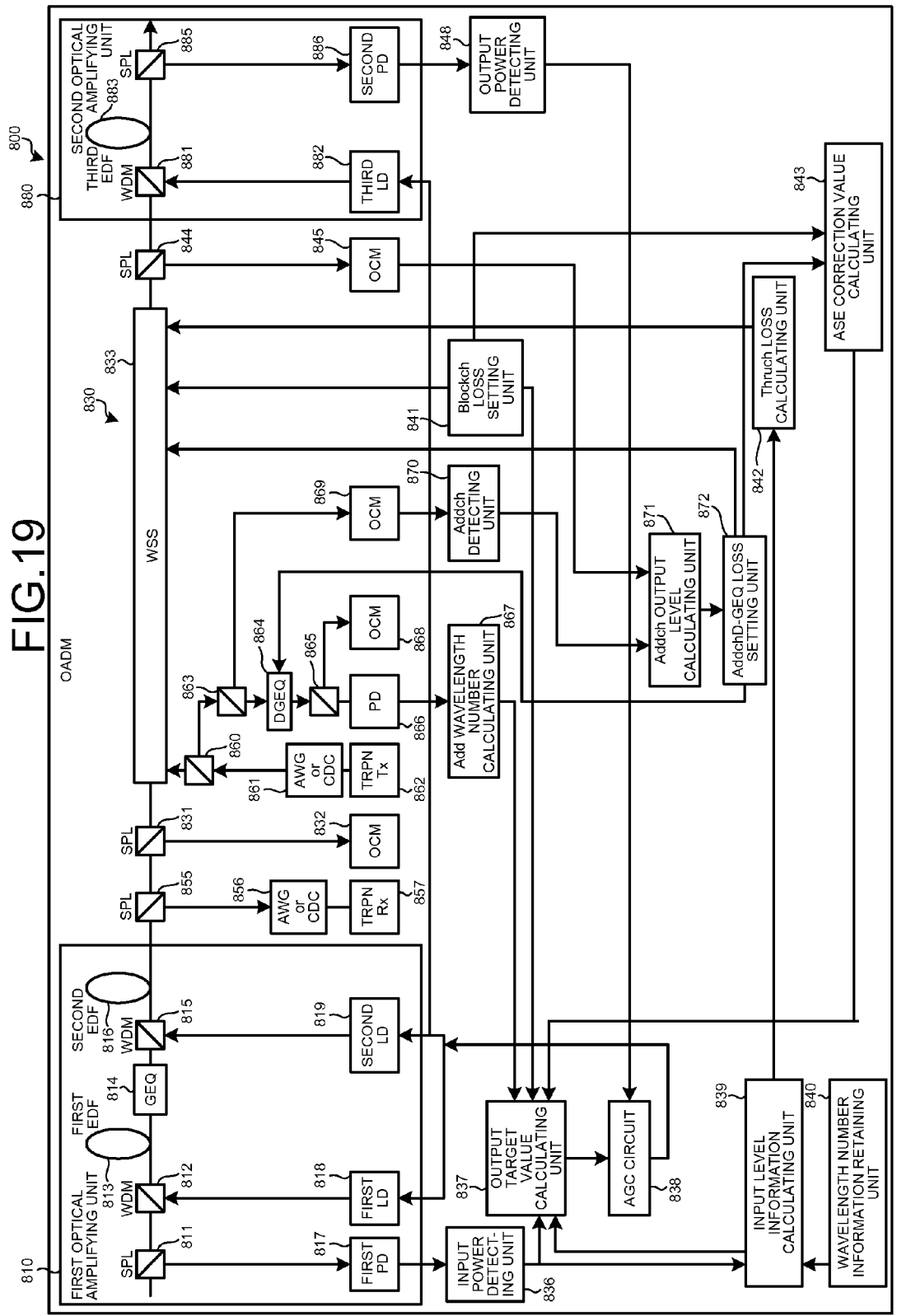
FIG. 19 is an example diagram of a configuration of the optical amplifier according to the sixth embodiment.

An example of an optical amplifier according to a sixth embodiment will be described with reference to FIG. 19. FIG. 19 is an example diagram of a configuration of the optical amplifier according to the sixth embodiment. As illustrated in the example in FIG. 19, an optical amplifier 800 includes a first optical amplifying unit 810, an OADM 830, and a second optical amplifying unit 880. The first optical amplifying unit 810 includes an SPL 811, a WDM 812, a first EDF 813, a GEQ 814, a WDM 815, a second EDF 816, a first PD 817, a first LD 818, and a second LD 819. The OADM 830 includes an SPL 855, an AWGorCDC 856, a TRPNRx 857, an SPL 831, and an OCM 832. The OADM 830 further includes a WSS 833, an input power detecting unit 836, an output target value calculating unit 837, an AGC circuit 838, an input level information calculating unit 839, and a wavelength number information retaining unit 840. The OADM 830 further includes a Blockch loss setting unit 841, a Thruch loss calculating unit 842, an ASE correction value calculating unit 843, an SPL 844, an OCM. 845, and an output power detecting unit 848. The OADM 830 further includes a CPL 860, an AWGorCDC 861, a TRPNTx 862, an SPL 863, a DGEQ 864, an SPL 865, and a. PD 866, an Add wavelength number calculating unit 867, an OCM 868, an OCM 869, and an Addch detecting unit 870. The OADM 830 further includes an Addch output level calculating unit 871 and an AddchDGEQ loss setting unit 872. The second optical amplifying unit 880 includes a. WDM 881, a third LD 882, a third EDF 883, an SPL 885, and a second PD 886. The devices identical to those of the first embodiment or the second embodiment are denoted by numbers with the last two digits identical to those of the first embodiment or the second embodiment, and explanation thereof will be appropriately omitted.

Because the first optical amplifying unit 810 is the same as the first optical amplifying unit 310 according to the first embodiment, explanation thereof will be omitted. Because output to the WSS 833 is performed in the same manner as that of the output to the WSS 533 according to the third embodiment, explanation thereof will be omitted. While the third embodiment includes one optical amplifying unit, the sixth embodiment includes two optical amplifying units.

The following describes calculation of the output target value. The output target value calculating unit 837 subtracts the signal power Pin per wavelength output from the input level information calculating unit 839 from the output target value Pout target (dBm/ch) per wavelength, thereby calculating the target gain Gtarget (dB). The target gain Gtarget (dB) can be calculated by Equation (2), fox example.

The output target value calculating unit 837 acquires the all signal power Pintotal (dBm) from the input power detecting unit 836 and acquires the number Nblock of wavelengths to be blocked by the WSS 833 from the Blockch loss setting unit 841. The output target value calculating unit 837 also acquires the number Nadd of wavelengths to be added from the Add wavelength number calculating unit 867.

The output target value calculating unit 837 calculates the output target value Pouttargettotal (dBm) using the number Nblock of wavelengths to be blocked, the number Nadd of wavelengths to be added, the target gain Gtarget, the all signal power Pintotal, and the output target value Pouttarget per wavelength with Equation (13).

$$Pouttargettotal = 10*\log[10^{(Gtarget+Pintotal)/10)} - (Nblock-Nadd)*10^{(Pouttarget/10)}] \quad (13)$$

Similarly to the first embodiment or the second embodiment, the output target value calculating unit 837 may acquire the ASE correction value, from the ASE correction value calculating unit. 843 and calculate the output target value by predicting the influence of ASE.

Given G1 is gain, provided by the first optical amplifying unit 810 and G2 is gain provided by the second optical amplifying unit 880, the AGC circuit 838 may calculate G1 and G2 with Equation (11) and Equation (12).

The AGC circuit 838 may calculate the number Nthrough of Through signals by subtracting the number Nblock of wavelengths to be blocked and the number Nadd of wavelengths to be added from the number of all the signals.

In a case where the gain G2 is too high and the gain G1 is left, the Thruch loss calculating unit 842 may increase the attenuation amount of the transmission signals, thereby adjusting the gain.

Thus, the AGC circuit 838 can accurately control the gain in each of the optical amplifying units using the calculated output target value in a case where the optical amplifying units are arranged before and after the WSS.

The following describes the advantageous effects of the optical amplifiers according to the first to the sixth embodiments. The first optical amplifying unit 410 according to the second embodiment provides gain corresponding to loss in the transmission line to wavelength multiplexed light received from the transmission line, thereby amplifying the light intensity. The WSS 433 drops signal light at some wavelengths included in the amplified wavelength multiplexed light from the wavelength multiplexed light or adds signal light at a wavelength not included in the amplified wavelength multiplexed light to the wavelength multiplexed light. The Thruch loss calculating unit 442 adjusts loss provided to each wavelength of the wavelength multiplexed light based on the gain corresponding to the loss in the transmission line. With this configuration, in a case where the gain provided to the wavelength multiplexed light is changed, the optical amplifier according to the second embodiment flattens the gain using the attenuation function of the WSS instead of VOA, thereby eliminating a gain tilt. Therefore, it is possible to reduce the number of components and thus downsize the device.

The Thruch loss calculating unit 442 adjusts the loss provided to the wavelength multiplexed light at each wavelength using the attenuation amount table 10 that associates the loss provided to each wavelength of the wavelength multiplexed light with the gain corresponding to the loss in the transmission line. With this configuration, in a case where a gain tilt occurs because of a change in the gain provided to the wavelength multiplexed light, the optical amplifier can eliminate the gain tilt using the attenuation function of the WSS.

The output target value calculating unit 437 calculates the gain corresponding to the loss in the transmission line based on the gain corresponding to the loss, the light intensity at all the wavelengths of the wavelength multiplexed light received from the transmission line, and the light intensity of the signal light dropped or added by a dropping and adding unit. With this configuration, in a case where the signal light is added or dropped, the optical amplifier can accurately control the gain provided to the wavelength multiplexed light.

The output target value calculating unit 437 calculates the light intensity of the signal light dropped or added by the dropping and adding unit based on the output target value per wavelength and the number of dropped or added signal light. With this configuration, in a case where the signal light is added or dropped, the optical amplifier can accurately control the gain provided to the wavelength multiplexed light.

The DGEQ 464 selects the added signal light. The PD 466 measures the light intensity of the entire added signal light. The OCM 468 measures the light intensity at each wavelength of the added signal light. The output target value calculating unit 437 calculates the number of added signal light based on the light intensity of the entire added signal light and the light intensity at each wavelength of the added signal light. With this configuration, in a case where signal light is suddenly added, the optical amplifier can accurately calculate the number of added signal light.

While the explanation has been made of the processing performed by each processing unit according to the second embodiment, the processing described above may be performed by each processing unit according to the first embodiment and the third to the sixth embodiments.

An embodiment of the present invention can downsize the device.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical amplifier comprising:
an optical amplifying unit that provides a gain to wavelength multiplexed light received from a transmission line, to amplify light intensity, the wavelength multiplexed light including signals at respective wavelengths, the gain being determined according to a loss caused on the transmission line;
a splitting unit that splits the amplified wavelength multiplexed light into a first portion at a predetermined wavelength and a second portion at a wavelength other than the predetermined wavelength;
an attenuation amount output unit that outputs attenuation amounts respectively provided to signals of the first portion of the split wavelength multiplexed light, the attenuation amounts being determined according to a value of the gain; and
a calculating unit that calculates a gain provided to the optical amplifying unit based on the value of the gain, a light intensity at all wavelengths of the wavelength multiplexed light received from the transmission line, and a light intensity of a signal included in the second portion, wherein
the splitting unit attenuates each of the signals of the first portion respectively according to the attenuation amounts output by the attenuation amount output unit.

2. An optical amplifier comprising:
an optical amplifying unit that provides a gain to wavelength multiplexed light received from a transmission line, to amplify light intensity, the wavelength multiplexed light including signals at respective wavelengths, the gain being determined according to a loss caused on the transmission line;
an adding unit that adds a signal of light at a predetermined wavelength to the amplified wavelength multiplexed light;
a calculating unit that calculates a gain provided to the optical amplifying unit based on a value of the gain, a light intensity at all wavelengths of the wavelength multiplexed light received from the transmission line, and a light intensity of the added signal of the light at the predetermined wavelength; and
an attenuation amount output unit that outputs attenuation amounts respectively provided to signals of the wavelength multiplexed light including the signal of the light at the predetermined wavelength, the attenuation amounts being determined according to the value of the gain, wherein
the adding unit attenuates the signals of the wavelength multiplexed light respectively according to the attenuation amounts output by the attenuation amount output unit.

3. An optical amplifier comprising:
an optical amplifying unit that provides a gain to wavelength multiplexed light received from a transmission line, to amplify light intensity, the wavelength multiplexed light including signals at respective wavelengths, the gain being determined according to a loss caused on the transmission line;
a splitting unit that splits the amplified wavelength multiplexed light into a first portion at a predetermined wavelength and a second portion at a wavelength other than the predetermined wavelength;
an attenuation amount output unit that outputs attenuation amounts respectively provided to signals of the first portion of the split wavelength multiplexed light, the attenuation amounts being determined according to a value of the gain;
an adding unit that adds a signal of light at a predetermined wavelength to the amplified wavelength multiplexed light; and
a calculating unit that calculates a gain provided to the optical amplifying unit based on the value of the gain, a light intensity at all wavelengths of the wavelength multiplexed light received from the transmission line, a light intensity of a signal included in the second portion, and a light intensity of the added signal of the light at the predetermined wavelength, wherein the adding unit attenuates the signals of the first portion respectively according to the attenuation amounts output by the attenuation amount output unit.

4. The optical amplifier according to claim 1, wherein the attenuation amount output unit outputs the attenuation amounts indicated on a table that associates attenuation amounts respectively provided to the signals of the first portion with the gain determined according to a loss caused in the transmission line.

* * * * *